US012641204B2

(12) United States Patent
Eck

(10) Patent No.: US 12,641,204 B2
(45) Date of Patent: May 26, 2026

(54) SYSTEMS AND METHODS FOR PROJECTION MAPPING ONTO MULTIPLE RIGID BODIES

(71) Applicant: Universal City Studios LLC, Universal City, CA (US)

(72) Inventor: Timothy J. Eck, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 18/932,958

(22) Filed: Oct. 31, 2024

(65) Prior Publication Data

US 2025/0142029 A1 May 1, 2025

Related U.S. Application Data

(60) Provisional application No. 63/594,698, filed on Oct. 31, 2023.

(51) Int. Cl.
*H04N 9/31* (2006.01)
*G06F 3/01* (2006.01)

(52) U.S. Cl.
CPC ........... *H04N 9/3141* (2013.01); *G06F 3/011* (2013.01); *H04N 9/312* (2013.01)

(58) Field of Classification Search
CPC ....... G06F 3/011; H04N 9/312; H04N 9/3141
See application file for complete search history.

(56) References Cited

U.S. PATENT DOCUMENTS

| | | | | |
|---|---|---|---|---|
| 4,439,157 A * | 3/1984 | Breglia | .............. | G02B 27/0172 |
| | | | | 359/618 |
| 6,543,899 B2 * | 4/2003 | Covannon | ............ | G02B 27/017 |
| | | | | 353/11 |
| 6,652,104 B2 * | 11/2003 | Nishida | ................ | H04N 9/3185 |
| | | | | 353/69 |
| 6,877,863 B2 * | 4/2005 | Wood | ................... | H04N 9/3185 |
| | | | | 353/42 |
| 7,070,283 B2 * | 7/2006 | Akutsu | .................... | H04N 5/74 |
| | | | | 353/30 |

(Continued)

FOREIGN PATENT DOCUMENTS

WO 2022216913 A1 10/2022

OTHER PUBLICATIONS

PCT/US2024/053970 International Search Report and Written Opinion mailed Feb. 10, 2025.

(Continued)

*Primary Examiner* — Michael B. Pierorazio
(74) *Attorney, Agent, or Firm* — Fletcher Yoder, P.C.

(57) ABSTRACT

An attraction system may include a projection mapped tangible show element with a first rigid body including a first shell coupled to a first tracker, a second rigid body including a second shell coupled to a second tracker, and a connection coupling the first rigid body and the second rigid body to one another. The connection may enable movement of the first rigid body relative to the second rigid body. The attraction system may also include an image sensor to generate sensor data indicative of a first position of the first rigid body and a second position of the second rigid body and a projector to project first image data on the first rigid body and second image data on the second rigid body.

20 Claims, 9 Drawing Sheets

(56) References Cited

U.S. PATENT DOCUMENTS

| | | | | |
|---|---|---|---|---|
| 7,119,965 B1* | 10/2006 | Rolland | | G02B 27/0172 |
| | | | | 359/630 |
| 7,182,466 B2* | 2/2007 | Sunaga | | H04N 5/74 |
| | | | | 353/69 |
| 7,270,421 B2* | 9/2007 | Shinozaki | | G03B 21/142 |
| | | | | 353/121 |
| 7,359,575 B2* | 4/2008 | Bassi | | G06T 3/18 |
| | | | | 345/427 |
| 7,441,906 B1* | 10/2008 | Wang | | G03B 21/14 |
| | | | | 353/121 |
| 7,782,387 B2* | 8/2010 | Azuma | | H04N 25/68 |
| | | | | 359/662 |
| 8,676,427 B1* | 3/2014 | Ferguson | | G08G 1/0965 |
| | | | | 701/23 |
| 9,418,475 B2 | 8/2016 | Medioni et al. | | |
| 9,753,126 B2* | 9/2017 | Smits | | G01S 17/003 |
| 9,810,913 B2* | 11/2017 | Smits | | G02B 5/124 |
| 10,067,230 B2* | 9/2018 | Smits | | G01S 17/86 |
| 10,261,183 B2* | 4/2019 | Smits | | G01S 7/4868 |
| 10,379,220 B1* | 8/2019 | Smits | | G01S 7/4811 |
| 10,394,112 B2* | 8/2019 | Johnson | | A01M 1/223 |
| 10,473,921 B2* | 11/2019 | Smits | | G01S 17/87 |
| 10,565,436 B2 | 2/2020 | Takeuchi | | |
| 10,591,605 B2* | 3/2020 | Smits | | G01S 17/42 |
| 10,663,626 B2* | 5/2020 | Benitez | | G02B 27/01 |
| 11,337,652 B2 | 5/2022 | Kaifosh et al. | | |
| 11,830,455 B2* | 11/2023 | Schriever | | G09G 5/005 |
| 2002/0051095 A1* | 5/2002 | Su | | H04N 9/3194 |
| | | | | 348/745 |
| 2002/0067466 A1* | 6/2002 | Covannon | | G02B 30/26 |
| | | | | 353/8 |
| 2002/0122161 A1* | 9/2002 | Nishida | | H04N 9/3194 |
| | | | | 353/70 |
| 2003/0191836 A1* | 10/2003 | Murtha | | H04L 67/02 |
| | | | | 709/224 |
| 2003/0210381 A1* | 11/2003 | Itaki | | H04N 5/74 |
| | | | | 353/70 |
| 2004/0156024 A1* | 8/2004 | Matsuda | | H04N 9/3185 |
| | | | | 353/70 |
| 2005/0046803 A1* | 3/2005 | Akutsu | | H04N 5/74 |
| | | | | 353/69 |
| 2005/0073661 A1* | 4/2005 | Tamura | | H04N 9/3194 |
| | | | | 353/70 |
| 2005/0151934 A1* | 7/2005 | Akutsu | | G03B 21/147 |
| | | | | 353/69 |
| 2005/0237492 A1* | 10/2005 | Shinozaki | | H04N 9/3185 |
| | | | | 353/69 |
| 2006/0098167 A1* | 5/2006 | Sato | | G03B 21/26 |
| | | | | 353/35 |
| 2006/0203207 A1* | 9/2006 | Ikeda | | H04N 9/3185 |
| | | | | 353/70 |
| 2007/0008344 A1* | 1/2007 | Medina | | G06T 15/10 |
| | | | | 345/647 |
| 2007/0257941 A1* | 11/2007 | Plut | | G06F 9/451 |
| | | | | 345/660 |
| 2007/0285626 A1* | 12/2007 | Miyasaka | | G03B 21/206 |
| | | | | 353/85 |
| 2009/0278999 A1* | 11/2009 | Ofune | | H04N 21/47 |
| | | | | 348/E3.048 |
| 2010/0002123 A1* | 1/2010 | Nozaki | | H04N 23/00 |
| | | | | 348/E5.022 |
| 2010/0045942 A1* | 2/2010 | Furui | | H04N 9/3194 |
| | | | | 353/69 |
| 2011/0085044 A1* | 4/2011 | Noda | | G03B 21/58 |
| | | | | 348/E5.133 |
| 2011/0210979 A1* | 9/2011 | Furui | | G03B 37/04 |
| | | | | 345/619 |
| 2011/0234994 A1* | 9/2011 | Uchiyama | | H04N 9/3185 |
| | | | | 353/121 |
| 2011/0285971 A1* | 11/2011 | Oka | | H04N 9/3185 |
| | | | | 353/70 |
| 2011/0292351 A1* | 12/2011 | Ishii | | H04N 9/3185 |
| | | | | 353/69 |
| 2013/0245877 A1* | 9/2013 | Ferguson | | G06V 20/56 |
| | | | | 701/23 |
| 2014/0303827 A1* | 10/2014 | Dolgov | | B60W 30/00 |
| | | | | 701/23 |
| 2015/0094897 A1* | 4/2015 | Cuddihy | | B60W 30/00 |
| | | | | 701/23 |
| 2015/0336502 A1* | 11/2015 | Hillis | | G05D 1/0088 |
| | | | | 701/23 |
| 2017/0240096 A1* | 8/2017 | Ross | | G05D 1/0212 |
| 2018/0158102 A1* | 6/2018 | Choi | | G06Q 30/0251 |
| 2020/0174130 A1* | 6/2020 | Banerjee | | B60R 11/04 |
| 2021/0004610 A1* | 1/2021 | Huang | | G01S 17/10 |
| 2021/0168440 A1* | 6/2021 | Ho | | H04N 21/43632 |
| 2021/0205999 A1* | 7/2021 | Mecca | | B25J 9/1615 |
| 2021/0310823 A1* | 10/2021 | Wilbers | | G01C 21/3811 |
| 2021/0341310 A1* | 11/2021 | Wilbers | | G01C 21/26 |
| 2022/0039874 A1* | 2/2022 | Choi | | A61B 90/39 |
| 2022/0171412 A1* | 6/2022 | Cui | | G08B 3/10 |
| 2022/0201262 A1* | 6/2022 | Chen | | H04N 9/3185 |
| 2022/0242430 A1* | 8/2022 | Watano | | B60W 50/10 |
| 2022/0323874 A1* | 10/2022 | Jeromin | | A63G 31/00 |
| 2023/0010713 A1* | 1/2023 | Park | | G01S 17/88 |
| 2023/0377197 A1* | 11/2023 | Napolskikh | | G01C 11/06 |

OTHER PUBLICATIONS

Edisher Chkareuli, Roger Waters The Wall Live 2010, Oct. 28, 2015, pp. 1-2, YouTube, https://www.youtube.com/watch?v=qAtusYxDlaw&t=5984s.

* cited by examiner

SYSTEMS AND METHODS FOR PROJECTION MAPPING ONTO MULTIPLE RIGID BODIES

CROSS-REFERENCE TO RELATED APPLICATION

The present application claims priority to and the benefit of U.S. Provisional Application No. 63/594,698, entitled "SYSTEMS AND METHODS FOR PROJECTION MAPPING ONTO MULTIPLE RIGID BODIES," filed on Oct. 31, 2023, which is incorporated by reference herein in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks and other entertainment venues contain, among many other attractions, animated figures to entertain park guests. Certain animated figures may be brought to life by projection mapping, which traditionally directs predetermined appearances onto the animated figures. For example, a particular animated figure may be visually supplemented with a canned or fixed set of images projected by an internally-positioned projector that projects the images through a semi-transparent projection surface of the particular animated figure. It is presently recognized that advancements may be made to further immerse the guests within a particular attraction, ride, or interactive experience.

SUMMARY

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In an embodiment, an attraction system may include a show element with a first rigid body including a first shell coupled to a first tracker, a second rigid body including a second shell coupled to a second tracker, and a connection coupling the first rigid body and the second rigid body to one another. The connection may enable movement of the first rigid body relative to the second rigid body. The attraction system may also include an image sensor to generate sensor data indicative of a first position of the first rigid body and a second position of the second rigid body and a projector to project first image data on the first rigid body and second image data on the second rigid body.

In an embodiment, a non-transitory, computer-readable medium, comprising instructions, wherein the instructions, when executed by processing circuitry, are configured to cause the processing circuitry to perform operations including receiving sensor data from an image sensor of an attraction system, where the sensor data indicates respective positions of a plurality of rigid bodies coupled together to form a show element of the attraction system and determining the respective positions of the plurality of rigid bodies of the show element based on the sensor data. The processing circuitry may also perform operations including generating respective image data for the plurality of rigid bodies of the show element based on the respective positions and instructing a projector of the attraction system to project the respective image data onto the plurality of rigid bodies of the show element.

In an embodiment, an attraction system may include a show element with a plurality of rigid bodies coupled at one or more connections and a plurality of trackers, wherein each rigid body of the plurality of rigid bodies comprises at least one respective tracker of the plurality of trackers. The attraction system may also include an image sensor configured to provide sensor data indicative of the plurality of trackers, a projector configured to project image data on each rigid body of the plurality of rigid bodies, and a controller coupled to the image sensor and the projector. The controller may determine a respective position of each rigid body of the plurality of rigid bodies based on the sensor data, generate image data for each rigid body of the plurality of rigid bodies based on the respective position of each rigid body of the plurality of rigid bodies, and instruct the projector to project the image data onto each rigid body of the plurality of rigid bodies.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
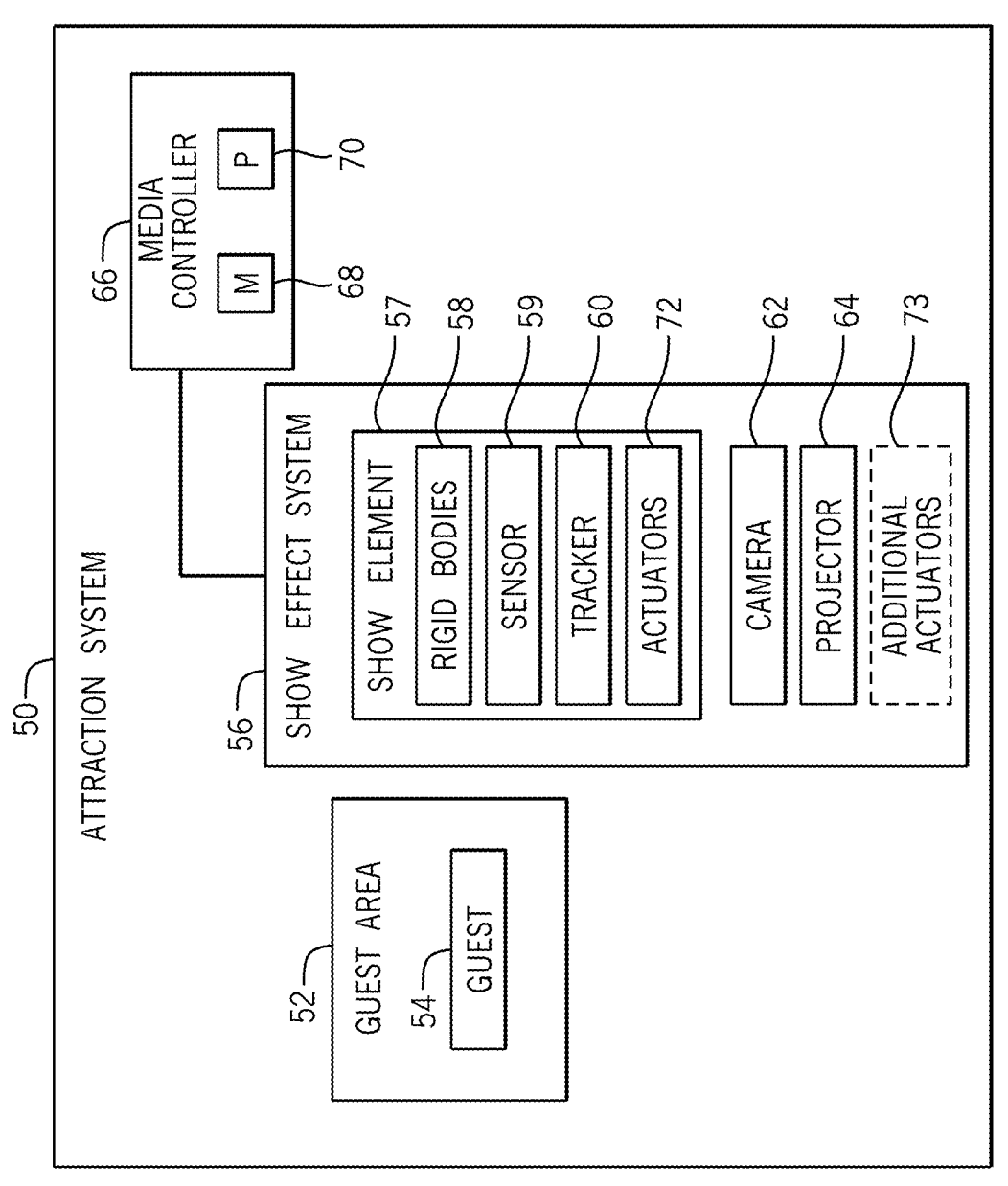
FIG. 1 is a block diagram of an embodiment of an attraction system, in accordance with the present disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to a show effect system for a venue, such as an entertainment venue (e.g., amusement park, theatre, sports arena) and/or any other type of venue (e.g., hotel, restaurant). The venue may include an attraction (e.g., a ride, a haunted house, an escape room, a performance stage, a maze) in which one or more projectors project images onto an external surface of a show element (e.g., show prop; tangible show element), such as a costume, an animated figure, a building, and/or structures that form an environment in the attraction. The show element may be a dynamic show element that moves within the attraction. By projection mapping onto the external surface of the animated figure, the animated figure may appear more lifelike and/or may display more special effects in comparison to conventional animated figures. As a more specific example, the projection mapping may be used to dynamically change appearance of costumes being worn by the animated figure to create a costume-changing illusion.

Prior to the projection mapping, a calibration may be carried out to align and coordinate one or more image sensors and the one or more projectors to provide an immersive experience for the guests. As described herein, the show element may be formed by multiple rigid bodies, and a sensor and/or an emitter may be integrated into each rigid body of the show prop to facilitate the calibration. To track the dynamic show element, the show element may be divided into and/or formed by the multiple rigid bodies that may each be fitted with trackers that enable the one or more image sensors to generate sensor data (e.g., image data) indicative of a respective position and/or a respective orientation of the multiple rigid bodies. A controller may receive and process the sensor data to discern respective movements, positions, and/or orientations of the multiple rigid bodies in real time (e.g., substantially real time, such as within milliseconds). Then, the controller may instruct the one or more projectors to project images onto the multiple rigid bodies in accordance with the respective movements, the positions, and/or the orientations of the multiple rigid bodies to accurately map the images to the show element.

The show element may be formed by coupling the multiple rigid bodies to one another. In certain instances, respective surfaces of the multiple rigid bodies may be textured (e.g., patterned) to visually appear like fabric or cloth and simulate the appearance of clothing. In this way, images projected onto the respective surfaces of the multiple rigid bodies may visually appear like clothing (e.g., dress, shirt, pants) to the guests. Thus, the multiple rigid bodies may produce the illusion of a unified element (e.g., unified image, one cohesive element) and/or several individual elements. For example, the multiple rigid bodies may produce the illusion of the unified element and then break into several individual elements during the show effect and/or to further the illusion.

With the preceding in mind, FIG. 1 is a block diagram of an embodiment of an attraction system 50, which may be used in a venue (e.g., an entertainment venue, such as an amusement park, or any other type of venue). As an example, a guest area 52 may include a path (e.g., a walkway, a queue, a line) traveled by guests 54 (e.g., one or more guests). As another example, the guest area 52 may include a space (e.g., a seating area) where the guests 54 may be positioned to view a performance (e.g., a show). As a further example, the guest area 52 may include one or more ride vehicles that may move and/or carry the guests 54.

Furthermore, the attraction system 50 may include a show effect system 56 that may provide entertainment to the guests 54. For example, the show effect system 56 may be part of an attraction (e.g., a ride, a haunted house, an escape room, a performance stage, a maze) and/or the show effect system 56 may provide entertainment to the guests 54 in other locations of the venue (e.g., while the guests 54 wait in a line for the attraction). While the show effect system 56 is positioned adjacent to the guest area 52 in FIG. 1, it may be understood that all or a portion of the show effect system 56 may be positioned within the guest area 52. The show effect system 56 may include a show element 57, which may include a physical object that is used to entertain the guests 54, such as by providing an immersive environment for the guests 54 with respect to the attraction system 50. For example, the show element 57 may include an animated figure. The animated figures may have any suitable form and/or characteristics, such as to correspond to (e.g., to appear similar to; to represent) humans, animals, virtual characters, and so forth. Additionally or alternatively, the show element 57 may include any suitable object, such as props (e.g., costume; handheld object), natural scenery (e.g., tree), buildings (e.g., façade of a house), decorate objects (e.g., furniture), and so forth. Additionally or alternatively, the show effect system 56 may include show action equipment, theatrical automation, and/or special effects (e.g., an illusion of special effects), such as fog, smoke, flames, fire, and so on. The show effect system 56 and/or the show element 57 may be positioned within the guest area 52 and/or positioned to be visible to the guests 54 located in the guest area 52.

The show element 57 may include multiple rigid bodies 58 coupled to each other to produce the illusion of a unified element (e.g., unified image, one cohesive element) and/or to appear as several individual elements. Each of the rigid bodies 58 may be an object or surface that maintains a shape and/or a structure during a projection mapping operation. For example, each of the rigid bodies 58 may be a three-dimensional object (e.g., cylinder) with a surface that maintains its shape and its structure during the projection mapping operation. To this end, each rigid body 58 may include an interior frame (e.g., support bar, support structure) coupled to the surface and/or be made from a rigid material, such as fiberglass, plastic, metal, ceramic, composite materials, and the like. As will be appreciated, each rigid body 58 may be any suitable shape or size. Further, the rigid bodies 58 that form the show element 57 may be made from different materials and/or have various shapes and/or sizes. For example, respective dimensions (e.g., shape, length, width, volume, diameter, circumference) of the rigid bodies 58 may be determined based on a corresponding part of the show element 57 and may be pre-determined (e.g., known) to provide a precise mapping of projected images (e.g., content). As such, the projected images may accurately align with a show element surface of the show element 57, accounting for its overall dimensions.

The show element 57 may include at least one tracker 60 (e.g., trackable marker) that provides an indication of a position and/or an orientation of the show element 57 within the attraction system 50. For example, each rigid body 58 may include at least one tracker 60 coupled with a respective surface or within a respective rigid body. For example, the at least one tracker 60 may be positioned on a respective surface of the rigid body 58, embedded within the rigid body 58, positioned behind or at a covered part of the rigid body 58, or otherwise placed in order to conceal the at least one tracker 60 from the guests 54 and maintain a realistic appearance of the show element 57 (e.g., avoid interference with the image projected onto the show element 57). For example, the at least one tracker 60 may be an infrared (IR) light-emitting diode (LED) positioned on a back surface of the rigid body 58 and that emits light captured by an image sensor (e.g., camera) 62. Thus, sensor data (e.g., image data) from the image sensor 62 may indicate and enable determination of the position and/or the orientation of the rigid body 58. To further conceal the at least one tracker 60, the at least one tracker 60 may emit in a range that may not be visible to the guests 54, such as in the infrared (IR) spectrum, the ultra-violet (UV) spectrum, and so on. In one embodiment, the at least one tracker 60 may include a reflective and/or a retroreflective marker that is configured to reflect light. In such cases, an off-board emitter (e.g., illuminator) may be placed in an environment (e.g., proximate to or at the image sensor 62), and the at least one tracker 60 may reflect light emitted by the off-board emitter. The at least one tracker 60 may include passive, active, or hybrid types, such as a passive retroreflector, a passive IR LED, an active IR LED, and so on.

Additionally or alternatively, the show element 57 may be fitted with at least one sensor 59. The at least one sensor 59 may include a calibration detector and/or a calibration emitter. For example, each rigid body 58 may include at least one sensor 59 positioned on a respective surface of the rigid body 58, embedded within the rigid body 58, or positioned behind or at a covered part of the rigid body 58.

The show effect system 56 may include the image sensor 62 that provides the sensor data indicative of the position and/or the orientation of the show element 57 (e.g., via the respective positions and/or the respective orientations of the rigid bodies 58) and a projector 64 that projects images onto the show element 57. The image sensor 62 may include a three-dimensional image sensor (e.g., three-dimensional camera), an IR sensor, a UV sensor, a depth-based sensor, and so on that provides the sensor data indicative of the position and/or the orientation of the show element 57. For example, the image sensor 62 may provide the sensor data indicative of the respective position and/or the respective orientation of the at least one sensor 59 (e.g., for calibration purposes) and/or the at least one tracker 60 (e.g., relative to a coordinate system for the attraction system 50), which is then used to determine the respective position and/or the respective orientation of each of the rigid bodies 58, which reflects the position and/or the orientation of the show element 57. It should be appreciated that the show effect system 56 may include multiple image sensors 62 (e.g., at different locations) that provide respective sensor data indicative of the position and/or the orientation of the show element 57.

The projector 64 may be an external projector, an optical projector with a lens, and so on. The projector 64 may project images onto the show element 57, and the images may provide engaging textures and/or other image features that match with a geometry or a contour of the show element 57. Indeed, the show element 57 may include non-flat surfaces onto which the images may be projected in order to provide a lifelike or realistic appearance of the show element 57. In particular, the projector 64 may project a first image on a first rigid body 58 of the show element 57, a second image on a second rigid body 58, and so on. The images (e.g., the first image and the second image) may combine and appear to the guests 54 as a unified image to provide a realistic appearance of the show element 57. In certain instances, the projector 64 may adjust the projection mapping on the show element 57. For example, the projector 64 may be configured to present a different image on the show element 57 at different times of the projection mapping operation in the attraction system 50, such as to simulate certain movements of the show element 57, costume changes of the show element 57, and the like. It should be appreciated that the show effect system 56 may include multiple projectors 64 (e.g., at different locations) that project respective images onto the show element 57.

The image sensor 62 and/or the projector 64 may be hidden or concealed from the guests in the guest area 52 to further enhance the immersive environment. In certain instances, the image sensor 62 and the projector 64 may be physically coupled to one another. For example, the image sensor 62 and the projector 64 may be coupled to one another and/or to a frame (e.g., rigid frame) to form a unified system. In certain instances, the image sensor 62 and the projector 64 may be rigidly mounted to one another and/or to the frame so that the two remain in fixed positions relative to one another. As noted herein, the show effect system 56 may include multiple image sensors 62 that provide sensor data of the show element 57 (e.g., sides of the show element 57) and multiple projectors 64 to deliver content to multiple sides of the show element 57.

To provide the projection mapping operations, the attraction system 50 may include or coordinate with a media controller 66 (e.g., a controller, a control system, an automated controller, a programmable controller, an electronic controller, control circuitry, a cloud-computing system) configured to operate the show effect system 56 to provide the interactive experience to the guests 54. For example, the media controller 66 may be communicatively coupled (e.g., via one or more wires, via wireless communication (e.g., via transmitters, receivers, transceivers)) to the show element 57, the image sensor 62, and the projector 64. The media controller 66 may include a memory 68 (representative of one or more memories) and a processor 70 (representative of one or more processors). The memory 68 may include volatile memory, such as random-access memory (RAM), and/or non-volatile memory, such as read-only memory (ROM), optical drives, hard disc drives, solid-state drives, or any other non-transitory computer-readable medium that includes instructions to operate the show effect system 56. The processor 70 may be configured to execute such instructions. For example, the processor 70 may include one or more application specific integrated circuits (ASICs), one or more field programmable gate arrays (FPGAs), one or more general-purpose processors, or any combination thereof.

In certain instances, the media controller 66 may include one or more controllers that are communicatively coupled and may individually or collectively perform actions described herein. Further, the one or more media controllers 66 may include one or more processors 70 and/or one or more memories 68 that may individually or collectively perform the actions described herein (e.g., the one or more processors 70 includes multiple processors, and a first processor of the one or more processors 70 performs certain operations, a second processor of the one or more processors 70 performs other operations, and so on). Accordingly, terms such as "controller," "control system" and/or "processing circuitry" as used herein may refer to any variation and/or configuration of the one or more controllers 66, the one or more processors 70, and/or the one or more memories 68 that operate together in any suitable manner to carry out disclosed techniques.

The media controller 66 may receive and process the sensor data from the image sensor 62 to determine the position and/or the orientation of the show element 57 within the attraction system 50. For example, the media controller 66 may determine the respective position and/or the respective orientation of each rigid body 58 of the show element 57 relative to a reference point within the attraction system 50 (e.g., relative to the coordinate system for the attraction system 50). Additionally or alternatively, the media controller 66 may determine the respective position and/or the respective orientation of each rigid body 58 used in the show element 57 relative to one another. Additionally or alternatively, the media controller 66 may store calibration data corresponding to the respective positions and/or the respective orientations of each rigid body 58 used in the show element 57 relative to one another (e.g., initial positions and/or initial orientations; a configuration, layout, and/or arrangement of the rigid bodies 58), as well as respective geometries (e.g., respective shapes and respective dimensions) of each rigid body 58 used in the show element 57. The calibration data may also indicate a calibration between an overall three-dimensional (3D) space of the attraction system 50 and a projector space (e.g., pixel space; of the projector 64). In this way, each rigid body 58, the projector space, and the attraction system 50 may be calibrated, tracked, and operated according to a shared coordinate system (e.g., the coordinate system for the attraction system 50). For example, the calibration data may indicate that a first rigid body 58 corresponding to an arm of the show element 57 is coupled to a second rigid body 58 corresponding to a torso of the show element 57. The calibration data may also indicate a relative distance, a relative motion, and/or a coupling mechanism (e.g., indicative of possible relative distance and/or relative motion, such as possible separation and/or degree of rotation), and the like, between the first rigid body 58 and the second rigid body 58, and so on. As such, the media controller 66 may track and determine the respective position and/or the respective orientation of each rigid body 58 within the attraction system 50 based on the calibration data and/or the sensor data.

The media controller 66 may generate and transmit image data to the projector 64 for projection mapping. The media controller 66 may, for example, instruct the projector 64 to project the images on the show element 57 based on the sensor data and/or the calibration data. In certain instances, the media controller 66 may instruct the projector 64 to project a first image on the first rigid body 58, a second image on the second rigid body 58, and so on corresponding to the image data. The image data transmitted by the media controller 66 for projection onto a particular rigid body 58 may account for the respective position and/or the respective orientation of the particular rigid body 58, as well as for the respective dimensions of the particular rigid body 58. In this way, the unified image (e.g., cohesive element) projected on the show element 57 may accommodate an overall profile, such as a contour, a geometry, a shape, an outline, a surface area, a volume, and so forth, of the show element 57. The images projected onto the show element 57 may provide a realistic appearance of the show element 57.

In certain instances, the media controller 66 may instruct movement of the show element 57. For instance, the media controller 66 may cause rotation and/or translation of an entirety of the show element 57, instruct movement of a portion of the show element 57 (e.g., one or more of the rigid bodies 58) relative to a remainder of the show element 57, and so forth. To this end, the attraction system 50 may include actuators 72 communicatively coupled to the media controller 66 and configured to move the show element 57. The actuators 72 may include electro-mechanical actuators, pneumatic actuators, hydraulic actuators, shape memory alloy actuators, and/or any suitable actuators. For example, the media controller 66 may instruct the actuators 72 to cause movement of the first rigid body 58 and the second rigid body 58 to move the show element 57, such as based on a desired show effect and/or operation of the attraction system 50 (e.g., in coordination with other elements of the attraction system 50, such as movement of a ride vehicle and/or audio outputs in a show). For example, the actuators 72 may be external to and coupled to the show element 57. In such cases, the actuators 72 (e.g., external actuators) may include multi-degree of freedom (DOF) robotic manipulators (e.g., robotic arms, cartesian, gantry, parallel) that cause movement of the rigid bodies 58. Additionally or alternatively, the actuators 72 may include internal actuators communicatively coupled to the media controller 66 and configured to move the show element 57. For example, in such cases, the actuators 72 (e.g., internal actuators) may cause movement of the first rigid body 58 relative to the second rigid body 58, movement of multiple rigid bodies 58, and so on. Additionally or alternatively, the show element 57 may be moved by other means of actuation, such as human, animal, or biological provided motion. For example, the show element 57 may be coupled to one or more human manipulated rods and an operator may cause movement of the show element 57.

Similarly, the media controller 66 may be configured to cause movement of the image sensor 62 and/or the projector 64 (e.g., based on detected or timed movement of the show element 57) in order to detect and/or projection map onto the show element 57. Thus, the attraction system 50 may include additional actuators 73 communicatively coupled to the media controller 66 and configured to move the image sensor 62 and/or the projector 64. In such cases, the image sensor 62 and/or the projector 64 may be tracked via respective markers and/or fixed additional image sensors to enable accurate projection mapping. For example, the media controller 66 may instruct the additional actuators 73 to cause movement of the image sensor 62, such as to rotate and/or translate, in order to determine the position and/or the orientation of the show element 57 within the attraction system 50. In another example, the media controller 66 may instruct the additional actuators 73 to cause movement of the projector 64 in order to adjust projection mapping onto the show element 57 (e.g., to maintain projection of the images on the show element 57). Thus, the projector 64 may project the images onto the show element 57 in synchronization with a current position and/or a current orientation (e.g., pose) of the show element 57. The additional actuators 73 may also be utilized to control image focus and/or other aspects of the projector 64. Additionally or alternatively, the show element 57 and/or the projector 64 may be manually moved, such as by one or more of the guests 54, an operator, a technician, and/or another user of the attraction system 50, without usage of the media controller 66 and/or the additional actuators 73.

Additionally or alternatively, the media controller 66 may operate the attraction system 50 based on one or more of the guests 54, the operator, the technician, and/or another user associated with the attraction system 50. That is, the media controller 66 may operate the attraction system 50 based on received operating parameters associated with and/or received inputs provided by one or more users. For example, the image sensor 62 may provide the sensor data indicating respective positions and/or respective orientations of the one or more users within the attraction system 50, and the media controller 66 may instruct movement of the show element 57 relative to the respective position and/or the respective orientation of the one or more users.

It may be understood that the attraction system 50 may include more or less components than described above. For example, the attraction system 50 may include various other components and/or devices (e.g., lighting, speakers, fluid output devices) that provide other show effects, such as visual effects (e.g., light), audio effects (e.g., sound), smoke effects, water effects, and the like, that may further enhance the experience of the guests 54. The media controller 66 may be communicatively coupled to the various other components and devices and may instruct generation of the other show effects to complement or supplement the projection mapping. Indeed, the show effects, the show element 57, and the projector 64 may collectively create the immersive environment provided to the guests 54.

Figure 2:
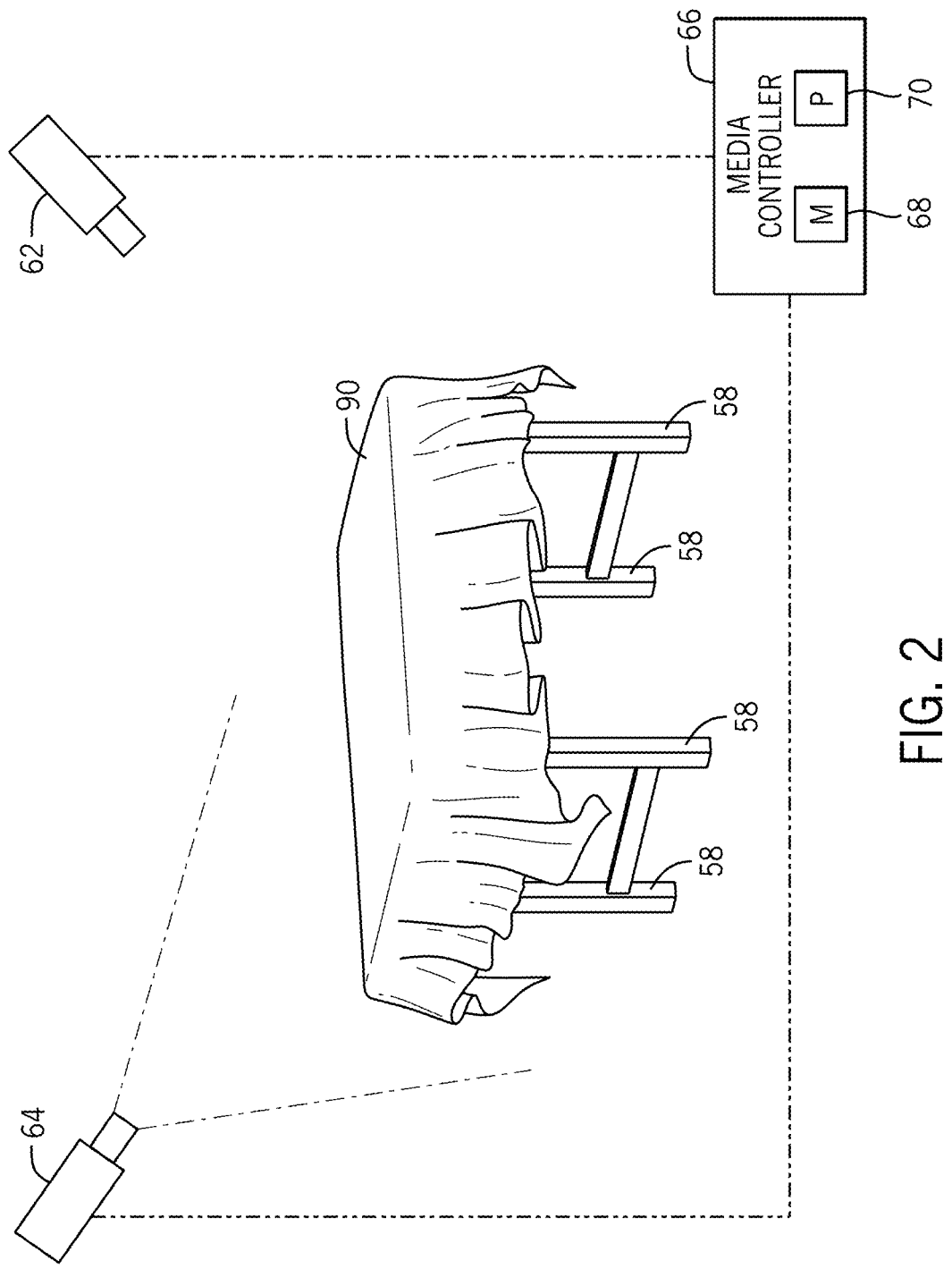
FIG. 2 is a perspective view of an embodiment of a static show element that may be used in the attraction system of FIG. 1, in accordance with the present disclosure.

FIG. 2 is a perspective view of an embodiment of a static show element 90 (e.g., a rigid table and a one-piece loose fabric overlaid onto the table as a tablecloth; without multiple rigid bodies that are configured to dynamically move relative to one another and within a show space). As illustrated, the static show element 90 may include a first component (e.g., table) covered by a second component (e.g., cloth, film, plastic, tablecloth). A geometry of the static show element 90, such as a volume and/or dimensions of a projection surface, may be determined prior to projection mapping operations. For example, a length and/or a width of the first component may be determined by measuring the first component. In another example, a geometry (e.g., profile) of the second component, such as a contour and/or a surface area, may be determined by measuring the fabric. In certain embodiments, a three-dimensional (3D) scan of the geometry of the first component and/or the second component may be carried out with Light Detection and Ranging (LIDAR) or any suitable scanning technology. As such, the 3D object and the 3D content match. Additionally or alternatively, a position and/or an orientation of the static show element 90 may be known and fixed during the projection mapping operations, since the static show element 90 may not move within an environment.

Projection mapping onto the static show element 90 may be based on the dimensions of the static show element 90, as well as its fixed position and/or its fixed orientation in the environment, to provide entertaining show effects, such as transforming the second component into a dynamic display by projecting images or adding texture to the second component. However, projection mapping on the second component may be challenging due to the properties of the second component. For example, the second component may include folds and/or overlaps at different areas, which may alter a shape and/or a size of a projection area (e.g., from prop to prop; from show to show; when subjected to external forces, such as a flow of air). That is, the second component may include peaks that may result in dark spaces where projected images may not be visible and/or valleys that may cause the projected images to appear shifted. Additionally or alternatively, the second component may be flexible and prone to slight movement that causes the folds and/or overlaps to be arranged and/or move in unexpected or unpredictable ways. As such, the authenticity of the projection mapping may be reduced as compared to embodiments disclosed here that incorporate multiple rigid bodies (e.g., to represent or mimic fabric; the multiple rigid bodies as the second component).

Figure 3:
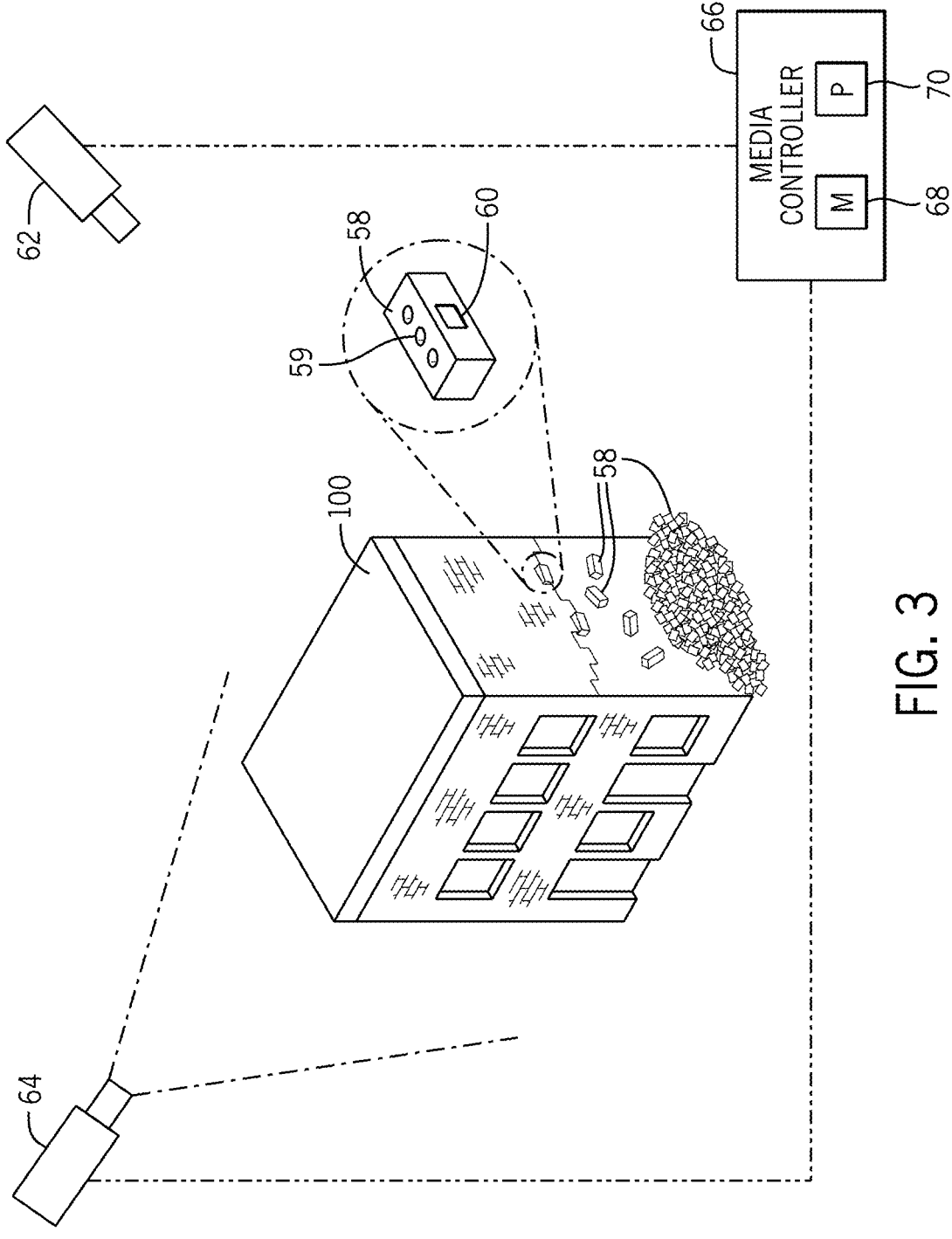
FIG. 3 is a perspective view of an embodiment of a dynamic show element that may be used in the attraction system of FIG. 1, in accordance with the present disclosure.

FIG. 3 is a perspective view of an embodiment of a dynamic show element 100. The dynamic show element 100 may include a brick building with multiple falling bricks. The dynamic show element 100 may be divided into multiple rigid bodies 58 (e.g., each brick used in the brick building). For example, each rigid body 58 may be a rigid structure with known dimensions. Additionally or alternatively, for calibration purposes, each rigid body 58 may include at least one tracker 60, and at least one sensor 59 (e.g., at least one detector and/or at least one emitter) that may be detected and tracked by an image sensor 62. The image sensor 62 may generate the sensor data indicative of the at least one tracker 60, and the sensor data may be used to determine a respective position and/or a respective orientation of each rigid body 58 within the dynamic show element 100. As described herein, the at least one sensor 59 may be used for a calibration process to align the image sensor 62 to the rigid bodies 58.

To present the dynamic show element 100 to the guests 54, projection mapping may be used to add images, such as color or texture, to each rigid body 58. To generate the images, the media controller 66 may first determine the respective position and/or the respective orientation of each rigid body 58 used in the show element 100. For example, the image sensor 62 may provide the sensor data indicative of the respective position and/or the respective orientation of each rigid body 58 (e.g., via the at least one tracker 60 of each rigid body 58) used in the dynamic show element 100.

In certain instances, the rigid bodies 58 may be moved to simulate a collapsing brick building. For example, the rigid bodies 58 forming a wall of the brick building may move in a downwards direction to create the effect. To projection map on the rigid bodies 58 as they move, the media controller 66 may track the respective position and/or the respective orientation of each rigid body 58 in real time (e.g., substantially real time). To this end, the image sensor 62 may provide the sensor data indicative of the respective position and/or the respective orientation of each rigid body 58 via the at least one tracker 60 in real time. The media controller 66 may generate respective image data for each rigid body 58 based on the respective position and/or the respective orientation of each rigid body 58 and instruct the projector 64 to project the respective images onto a corresponding or respective rigid body 58 (e.g., first image data onto a first rigid body 58, second data onto a second image body 58, and so forth).

In certain instances, behavior of each moving rigid body 58 may affect visibility and/or quality of the projection mapping. For example, shadows and/or reflections from each moving rigid body 58 may interfere with the projected images. As such, the media controller 66 may identify an intrinsic and/or expected behavior (e.g., changing positions, shadows, and/or reflections during collapse of the wall of the brick building) of each moving rigid body 58, and account for and/or adjust the image data based on the intrinsic and/or expected behavior, as well as the respective position and/or the respective orientation of each rigid body 58, during the projection mapping. In another example, ambient lighting may interfere with brightness or perceived color of the images. Indeed, the media controller 66 may also identify external factors, such as the ambient lighting from other lighting sources, from the sensor data provided by the image sensor 62, and so forth, and then adjust the image data (e.g., luminance level, color contrast) based on the external factors. To combat these complications (e.g., shadows, reflections, occlusions, depth, parallax), one or more projectors 64 may be directed toward the rigid bodies 58 at different angles and/or directions. As such, the projection mapping may create an immersive environment for the guests 54 by providing dynamic visual experiences.

Figure 4:
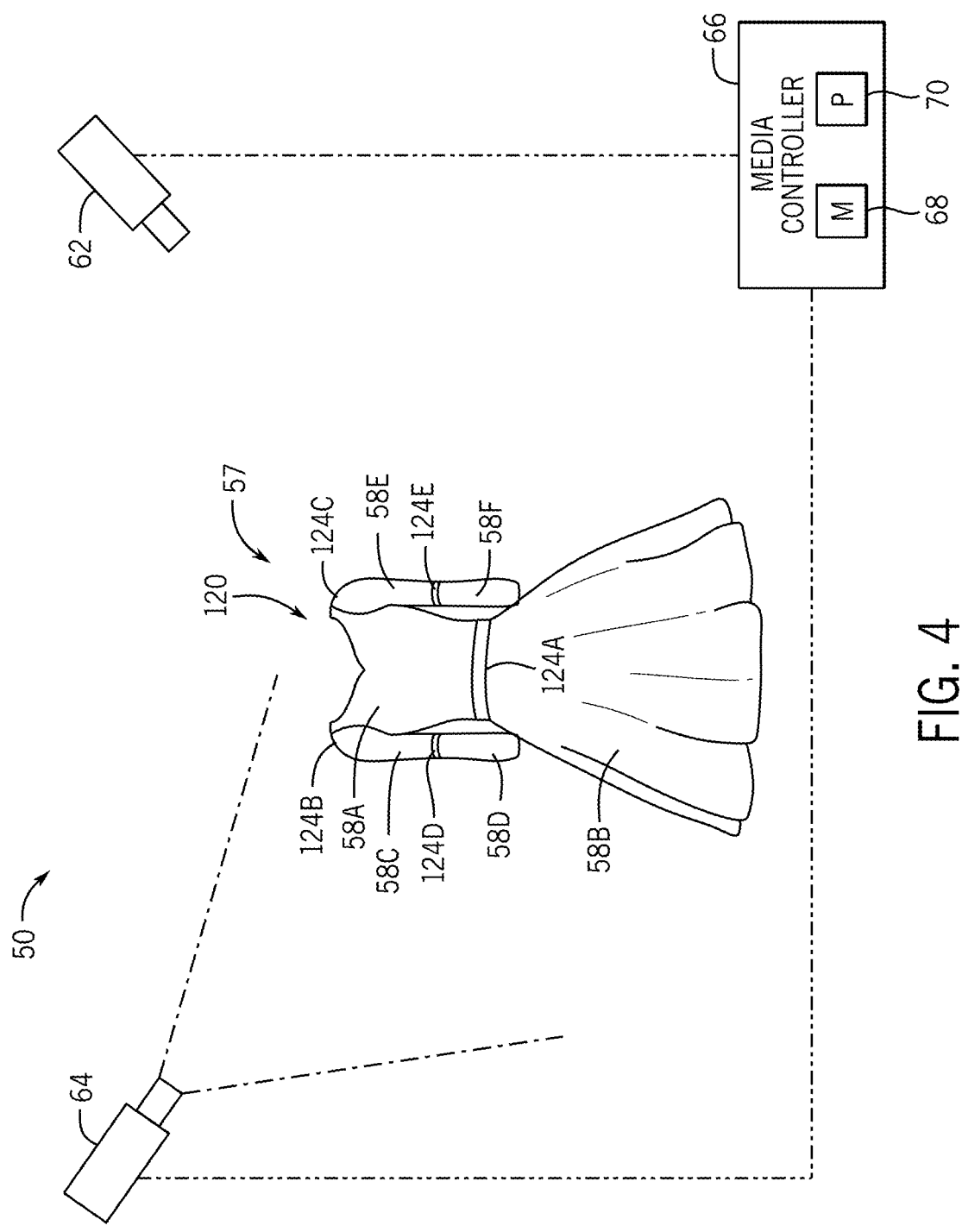
FIG. 4 is a front view of an embodiment of a show element including a costume that may be used in the attraction system of FIG. 1, in accordance with the present disclosure.

FIG. 4 is a front view of an embodiment of a show element 57 including a costume 120 that may be used in the attraction system 50. In an embodiment, the show element 57 may include the costume 120 and/or an animated figure, and in some such cases, the costume 120 may be worn by the animated figure. In certain instances, the show effect system 56 may provide a dynamically changing costume illusion to the guests 54 by projection mapping onto the show element 57. For example, the show element 57 may move and/or images projected onto the show element 57 may dynamically change to provide an immersive experience for the guests 54. To facilitate discussion, certain examples are described with reference to images projected onto the costume 120; however, it should be appreciated that the images may be projected onto any portion of the show element 57 (e.g., the costume 120 and/or the animated figure) having any suitable configuration (e.g., form, components, representing any type of object).

For example, to projection map onto the costume 120, the media controller 66 may track a position and/or an orientation of the costume 120. However, as discussed with respect to FIG. 2, tracking movement of loose, flexible fabric (e.g., a dress that hangs from shoulders and/or hips of the animated figure; without structure; not rigid) may be difficult due to peaks and valleys (e.g., varying and/or unpredictable peaks and valleys) that may form in the loose, flexible fabric. In addition, unknown surface(s) and/or unknown negative space created by movement of the costume 120 may create challenges for the projection mapping. To this end, embodiments of the present disclosure provide systems and methods to projection map onto a dynamic show element 57 formed by multiple rigid bodies 58 that may form a cohesive element and/or individual elements as desired. For example, the show element 57 and/or the costume 120 may be divided into multiple sections that each correspond to a respective rigid body 58 of the show element 57. As discussed herein, the rigid bodies 58 may be an object or surface that maintains a shape and/or a structure during the projection mapping operations.

As illustrated in FIG. 4, the show element 57 and/or the costume 120 may be divided into the rigid bodies 58 based on and/or to define seams within the costume 120. For example, a first rigid body 58A may be associated with a bodice of the costume 120, a second rigid body 58B may be associated with a skirt of the costume 120, a third rigid body 58C may be associated with a first upper sleeve of the costume 120, a fourth rigid body 58D may be associated with a first lower sleeve of the costume 120, a fifth rigid body 58E may be associated with a second upper sleeve of the costume 120, and a sixth rigid body 58F may be associated with a second lower sleeve of the costume 120.

The rigid bodies 58 may couple to one another at connections 124, which may correspond to and/or define the seams within the costume 120. In an embodiment, the rigid bodies 58 and the connections 124 may be placed to match and/or to simulate natural seams in typical costumes (e.g., other costumes made of loose, flexible fabric). For example, a first connection 124A may be between the first rigid body 58A and the second rigid body 58B, a second connection 124B may be between the first rigid body 58A and third rigid body 58C, a third connection 124C may be between the first rigid body 58A and the fifth rigid body 58E, a fourth connection 124D may be between the third rigid body 58C and the fourth rigid body 58D, and a fifth connection 124E may be between the fifth rigid body 58E and the sixth rigid body 58F. As described herein, the connections 124 or any other gap (e.g., break, crack) in a projection surface formed by the rigid bodies 58 may appear as a void, and thus the connections 124 or any other gap may be covered with material to provide the projection surface (e.g., to block appearance of the void in projection mapping content).

Figures 5, 6:
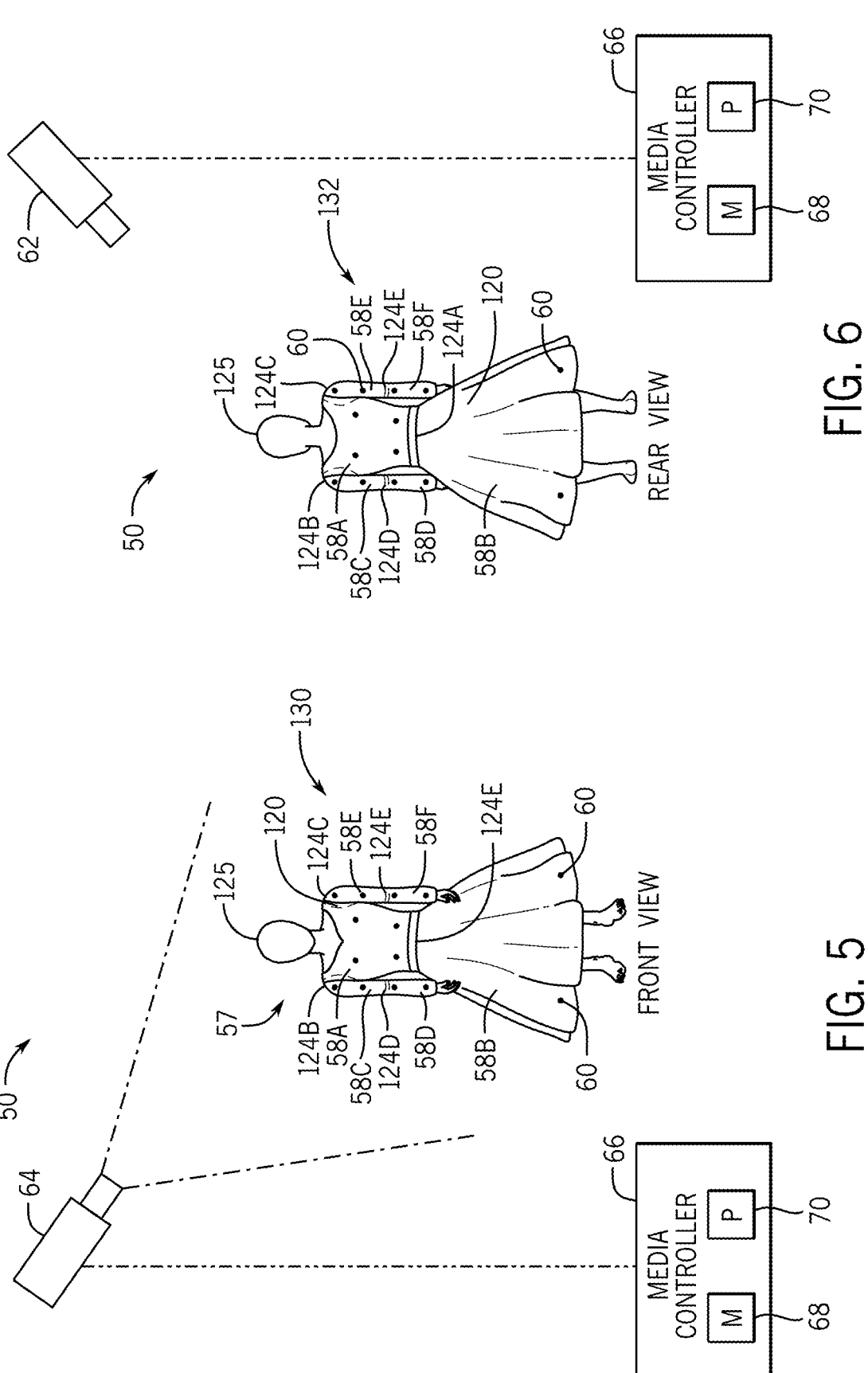
FIG. 5 is a front view of an embodiment of the show element including the costume and trackers, in accordance with the present disclosure.
FIG. 6 is a rear view of an embodiment of the show element of FIG. 5, in accordance with the present disclosure.

With the foregoing in mind, FIG. 5 is a front view of an embodiment of the show element 57 including the costume 120 and trackers 60 that may be used in the attraction system 50. As discussed with respect to FIG. 4, the show element 57 may include the costume 120 and/or an animated figure 125, and in some such cases, the costume 120 may be worn by the animated figure 125 (e.g., the costume 120 may appear to be worn by the animated figure 125; the costume 120 may be coupled to the animated figure 125, may be supported on the animated figure 125, and/or may include the animated figure 125). Additionally, the show element 57 or a portion thereof may be divided into and/or may include the rigid bodies 58, based on and/or to define seams within the show element 57 (e.g., seams within the costume 120). Additionally, each rigid body 58 may include at least one tracker 60 that may be used for projection mapping operations. For example, a first surface 130 of the costume 120 (e.g., front surface facing the guests 54) may include multiple trackers 60, such as fourteen trackers 60. The first rigid body 58A may include four trackers 60, the second rigid body 58B may include two trackers, the third rigid body 58C may include two trackers 60, the fourth rigid body 58D may include two trackers 60, the fifth rigid body 58E may include two trackers 60, and the sixth rigid body 58F may include two trackers 60. However, it may be understood that any suitable number of trackers 60 may couple to each rigid body 58. In an embodiment, the trackers 60 may couple to a respective distal end (e.g., end portions) of each rigid body 58 to provide an indication of the respective position and/or the respective orientation of each rigid body 58. However, it should be appreciated that the trackers 60 may be positioned at any of a variety of locations (e.g., known locations relative to a respective rigid body 58) to enable tracking the respective position and/or the respective orientation of each rigid body 58.

The media controller 66 may determine the respective position and/or the respective orientation of each rigid body 58 during the projection mapping operations. That is, based on the sensor data from the image sensor 62 (e.g., that indicates the multiple trackers 60), the media controller 66 may determine the respective position and/or the respective orientation of each rigid body 58 relative to one other and/or relative to a reference point within the attraction system 50 (e.g., the coordinate system for the attraction system 50), even while one or more of the rigid bodies 58 move within an environment of the attraction system 50. Further, the controller 66 may generate the image data based on the respective position and/or the respective orientation of each rigid body 58. For example, the media controller 66 may generate first image data based on the respective position and/or the respective orientation of the first rigid body 58A, wherein a first image is projected onto the first rigid body 58A; second image data based on the respective position and/or the respective orientation of the second rigid body 58B, wherein a second image is projected on the second rigid body 58B; and so on.

Further, the projector 64 may be calibrated and instructed to project the images onto each rigid body 58 based on the respective position and/or the respective orientation of each rigid body 58 as indicated by the respective trackers 60 coupled thereto. For example, the media controller 66 may adjust the dimensions and/or other features of the first image data (e.g., to create an adjusted first image) to correspond to the respective position and/or the respective orientation of the first rigid body 58A based on detected locations of the four trackers 60 coupled to the first rigid body 58A, and the media controller 66 may instruct the projector 64 to project the first image (e.g., the adjusted first image) onto the first rigid body 58A.

Because each rigid body 58 may have a respective fixed geometry and because each connection 124 may have a respective configuration (e.g., placement and operational features that provide limited relative motion and/or range of motion), the respective behavior (e.g., motion, positions, and/or orientations) of each rigid body 58 may be limited to certain configurations (e.g., known, available, expected, and/or predicted positions, such as relative positions and/or absolute positions) during operation of the show element 57. Accordingly, the media controller 66 may utilize the trackers 60 and the respective behavior of each rigid body 58 to efficiently and accurately generate the respective image data for each rigid body 58.

For example, movement of the fourth rigid body 58D may result in a fold being formed at the fourth connection 124D between the fourth rigid body 58D and the third rigid body 58C. The fold may result in a relatively dark region, which may interfere with appearance of the projection mapping and/or which should be accounted for in the projection mapping operation. Accordingly, the media controller 66 may adjust the image data (e.g., shift or adjust one or more image properties, such as image position, luminance, color saturation, brightness) based on the respective position and/or the respective orientation of the fourth rigid body 58D as indicated by the respective trackers 60 of the fourth rigid body 58D, but also based on the behavior of the fourth rigid body 58D and the third rigid body 58C. Additionally or alternatively, certain movements of the fourth rigid body 58D may be known and/or predicted to result in shadows and/or reflections being cast on a different rigid body 58

(e.g., the third rigid body 58C and/or some other rigid body 58). Accordingly, the media controller 66 may adjust the image data for the different rigid body 58 based on the movement of the fourth rigid body 58D to reduce the shadows and/or reflections, which may improve image quality. As such, the media controller 66 may adjust the images based on the respective position and/or the respective orientation and/or the behavior of the rigid bodies 58 that form the costume 120 to provide the realistic appearance of the costume 120. As discussed in more detail herein, the connection 124 may be covered by connection material (e.g., overlay; pulled tightly over the connection 124), but the connection material may form wrinkles (e.g., peaks and valleys) during certain movements of the rigid bodies 58. It should be appreciated that the media controller 66 may also account for the behavior of the connection material (e.g., known and/or predicted based on models and/or sample data), such that the media controller 66 may also adjust the image data based on the behavior of the connection material.

FIG. 6 is a rear view of an embodiment of the costume 120 that may form at least part of the show element 57 that may be used in the attraction system 50. As shown, a second surface 132 of the costume 120 (e.g., back surface facing away from the guests, rear surface, non-guest visible surface) may include multiple trackers 60, such as fourteen trackers 60. By positioning the trackers 60 on the second surface 132 of the costume 120, the trackers 60 may be concealed from the guests 54, calibration devices, and the like. Although the illustrated examples of FIGS. 5 and 6 include fourteen trackers 60, it may be understood that any suitable number of trackers 60 may be disposed of on the first surface 130 and/or the second surface 132 of the costume 120.

In certain instances, the costume 120 may include only the trackers 60 on the second surface and/or only the trackers 60 on the second surface may be tracked by the image sensor 62 during the projection mapping operations to determine the respective position and/or the respective orientation of each rigid body 58. In certain instances, the second surface may include a greater number of trackers 60 in comparison to the first surface. The greater number of trackers 60 may improve determination of the respective position and/or the respective orientation of each rigid body 58 by providing an increased number of data points and/or improved coverage by the trackers 60. Additionally, the first surface may be presented to the guests for a longer period of time in comparison to the second surface (or the second surface may not be visible to the guests 54 at all). As such, it may be desirable to provide and/or utilize only the trackers 60 on the second surface and/or to provide the greater number of trackers 60 on the second surface in order to hide and/or conceal the trackers 60 from the guests 54.

Figure 7:
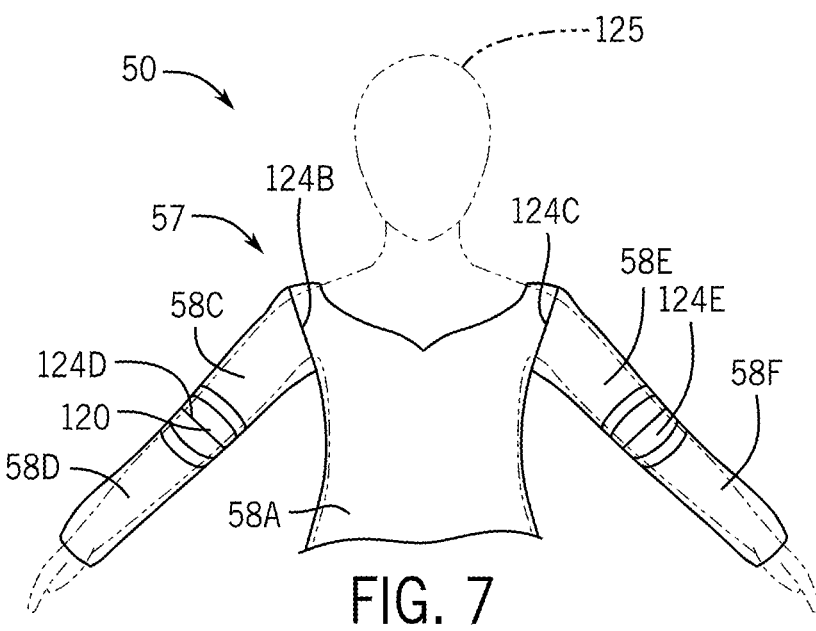
FIG. 7 is a close-up view of an embodiment of a portion of the show element of FIG. 5, in accordance with the present disclosure.

FIG. 7 is a close-up view of an embodiment of a portion of the show element 57 that may be used in attraction system 50. As shown, the show element 57 may include the costume 120 and/or the animated figure 125 (e.g., the costume 120 is worn by the animated figure 125). As discussed herein, the costume 120 may be formed by the multiple rigid bodies 58 that may be coupled together at respective connections 124. The rigid bodies 58 may be hand sculpted, three-dimensional (3D) printed, molded from plastic, and the like, based on a design. In this way, respective geometries of the rigid bodies 58 may be known. Additionally or alternatively, the respective geometries of the rigid bodies 58 may be determined by measuring, such as by 3D scanning. As such, the rigid bodies 58 may enable precise mapping of images and provide a visually realistic appearance of the show element 57 to the guests 54. Although the costume 120 includes six rigid bodies 58, it may be understood that the costume 120 and/or the show element 57 may include any suitable number of rigid bodies 58. For example, the show element 57 may include two or more rigid bodies, four or more rigid bodies, seven or more rigid bodies, ten or more rigid bodies, and so on.

Figure 8:
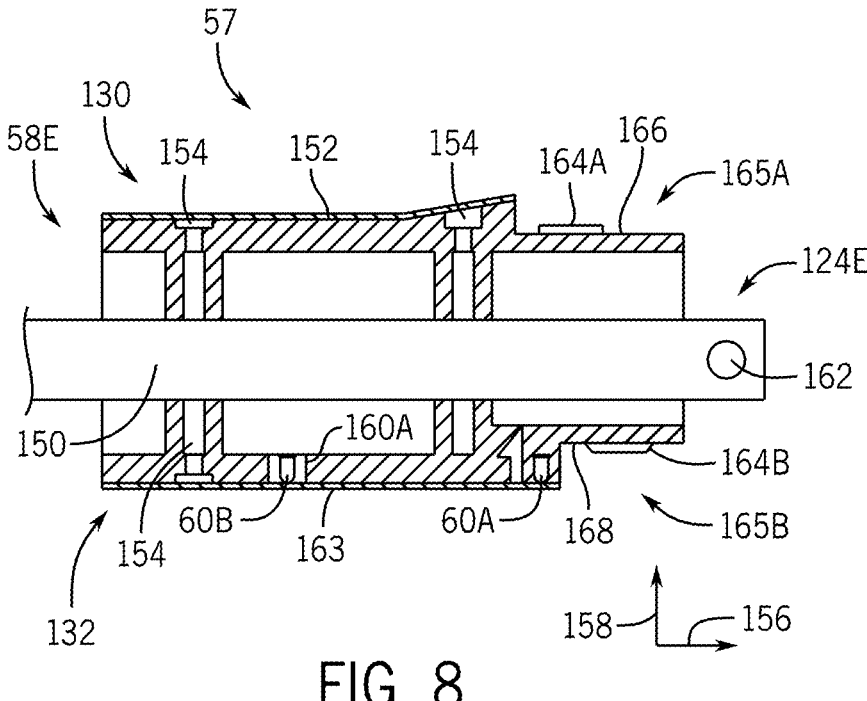
FIG. 8 is a cross-sectional view of an embodiment of a portion of the show element of FIG. 5, in accordance with the present disclosure.

With the foregoing in mind, FIG. 8 is a cross-sectional view of a portion of a rigid body 58 that may be used in the show element 57 in the attraction system 50. In particular, FIG. 8 illustrates a portion of the fifth rigid body 58E corresponding to the second upper arm of the show element 57 of FIGS. 4-7. The fifth rigid body 58E may include a support 150 (e.g., center support or bar), a shell 152 (e.g., annular shell), and/or multiple periphery attachments 154 (e.g., radial extensions; brackets; fasteners, such as threaded fasteners) that may couple the shell 152 to the support 150. The support 150 may be a rigid component that causes or facilitates movement of the rigid body 58, while the shell 152 may provide a surface area for the projected images. To this end, the support 150 may be moved via a manually applied force and/or based on instructions transmitted from the media controller (e.g., the media controller 66 described with respect to FIG. 1) to the actuators (e.g., the actuators 72 described with respect to FIG. 1).

To facilitate discussion, the portion of the rigid body 58 may be described with reference to a longitudinal axis or direction 156 and a lateral axis or direction 158. As shown, the support 150 may extend in the longitudinal direction 156, and the shell 152 may be offset with respect to the support 150 in the lateral direction 158. In an embodiment, the shell 152 may circumferentially surround the support 150. The dimensions of the shell 152 may be determined based on a corresponding part of the rigid body 58 used in the show element 57. For example, the shell 152 may be larger if designed to correspond to the torso and smaller if designed to correspond to the first lower arm. The shell 152 may include the multiple periphery attachments 154 placed at multiple locations in the longitudinal direction 156 along the support 150.

In one embodiment, the shell 152 may couple to and/or support at least one tracker 60. For example, the at least one tracker 60 may be embedded within the shell 152 (e.g., flush with a radially-outer surface of the shell 152; without a protrusion). To facilitate discussion and provide an example, in FIG. 8, a first tracker 60A is embedded within the shell 152 in this manner. Additionally or alternatively, the shell 152 may include at least one cavity 160 to receive the at least one tracker 60. To facilitate discussion and provide an example, in FIG. 8, the shell 152 includes a first cavity 160A with a second tracker 60B. The first tracker 60A and the second tracker 60B may provide an indication of the position and/or the orientation of the fifth rigid body 58E. During a calibration procedure, the position and/or the orientation of the at least one tracker 60 within the rigid body 58 may be determined. For example, the position and/or the orientation of the first tracker 60A and the second tracker 60B may be determined with respect to a reference point 162 (e.g., fifth connection 124E), portions of the fifth rigid body 58E, and/or with each other. The reference point 162 may be a pivot at one end (e.g., a proximal end) of the support 150. The first tracker 60A may be a first distance from the reference point 162 (e.g., in the longitudinal direction 156 and/or the radial direction 158), while the second tracker 60B may be a second distance from the reference point 162 (e.g., n the longitudinal direction 156 and/or the lateral direction 158). Additionally, a distance between the first tracker 60A and a second tracker 60B (e.g., in the longitudinal direction 156 and/or the lateral direction 158) may be determined based on a design and stored as calibration data.

To conceal the at least one tracker 60 from the guests 54, the at least one tracker 60 may be positioned on a surface of the shell 152 that corresponds to the second surface 132 of the show element 57. Additionally or alternatively, the shell 152 may couple to a cover 163 (e.g., fabric cover) that stretches across the at least one cavity 160 and/or the at least one tracker 60. The cover 163 may cover a portion of the shell 152 (e.g., over the at least one tracker 60; on the second surface 132 of the show element 57) or the cover 163 may surround and/or wrap circumferentially around the shell 152. In certain instances, the cover 163 may circumferentially surround the shell 152 and cover multiple trackers 60. In other instances, the cover 163 may go over the trackers 60 and a respective portion of the shell 152.

In an embodiment, the cover 163 may couple to one of the multiple periphery attachments 154, such that the cover 163 is pulled tightly and secured about the shell 152. For example, the multiple periphery attachments 154 may include a fastener (e.g., threaded fastener or pin) that extends through the cover 163 and into the shell 152 and the support 150 to couple the cover 163, the shell 152, and the support 150 to one another. As another example, the multiple periphery attachments 154 may include a fastener (e.g., threaded fastener or pin) that extends into the shell 152 and the support 150 to couple the shell 152 and the support 150 to one another, and the fastener may also include an additional fastener portion (e.g., adhesive, snap; on an end exposed at an outer surface of the shell 152) that couples to the cover 163. The cover 163 may be transparent or semi-transparent with respect to the emissions of the at least one tracker 60. For example, the at least one tracker 60 may be an IR LED and the cover 163 may be substantially IR transparent. In this way, the image sensor 62 may monitor the respective position and/or the respective orientation of the at least one tracker 60 within the attraction system 50.

The shell 152 may also provide the surface (e.g., projection surface) for the projection mapping. To this end, the surface of the shell 152 may be a neutral color to provide accurate color perception with respect to a target color as indicated in the image data. For example, the shell 152 may be a matte gray color. However, the shell 152 may be any suitable color, such as beige, white, off-white, and the like. Additionally or alternatively, the surface of the shell 152 may be textured to create a perception of a desired object. For example, the surface of the shell 152 may be textured to create the perception of fabric, wrinkles, threads, seams, and the like to provide a visual appearance of a costume (e.g., the costume 120 of FIGS. 4-7) to the guests. For example, the illustrated portion of the shell 152 may be perceived by the guests to appear as a sleeve on the costume. The projector may project the images to enhance the surface texture and/or provide color for the costume. In this way, projection mapping of the images on the shell 152 may provide a realistic appearance of the costume. Additionally, the projector may project different images during different times of the projection mapping operation to create the costume-changing illusion.

As discussed herein, the rigid bodies 58 may couple together at respective connections 124 to form the show element 57. Proximate to the connection 124, the shell 152 may include the one or more fasteners 164. To this end, the shell 152 may include and/or may be configured to provide a cavity 165A (e.g., a cavity portion or a recessed portion; a portion of the shell 152 may define or include a cavity wall 166 that defines the cavity 165A) proximate to the fifth connection 124E. The cavity 165A may accommodate a component of a first fastener 164A (e.g., the cavity wall 166 may support the component of the first fastener 164A). In an embodiment, the shell 152 may include and/or may be configured to provide an additional cavity 165B (e.g., a cavity portion or a recessed portion; a portion of the shell 152 may define or include an additional cavity wall 168 that defines the additional cavity 165B) proximate to the fifth connection 124E. The additional cavity 165B may accommodate a component of a second fastener 164B (e.g., the additional cavity wall 168 may support the component of the second fastener 164B). It should be appreciated that the cavity wall 166 and the additional cavity wall 168 may be one annular surface (e.g., extends circumferentially about at the shell 152), or the cavity wall 166 and the additional cavity wall 168 may be separate from one another and distributed about the shell 152 (e.g., distributed circumferentially about the shell 152).

Figure 9:
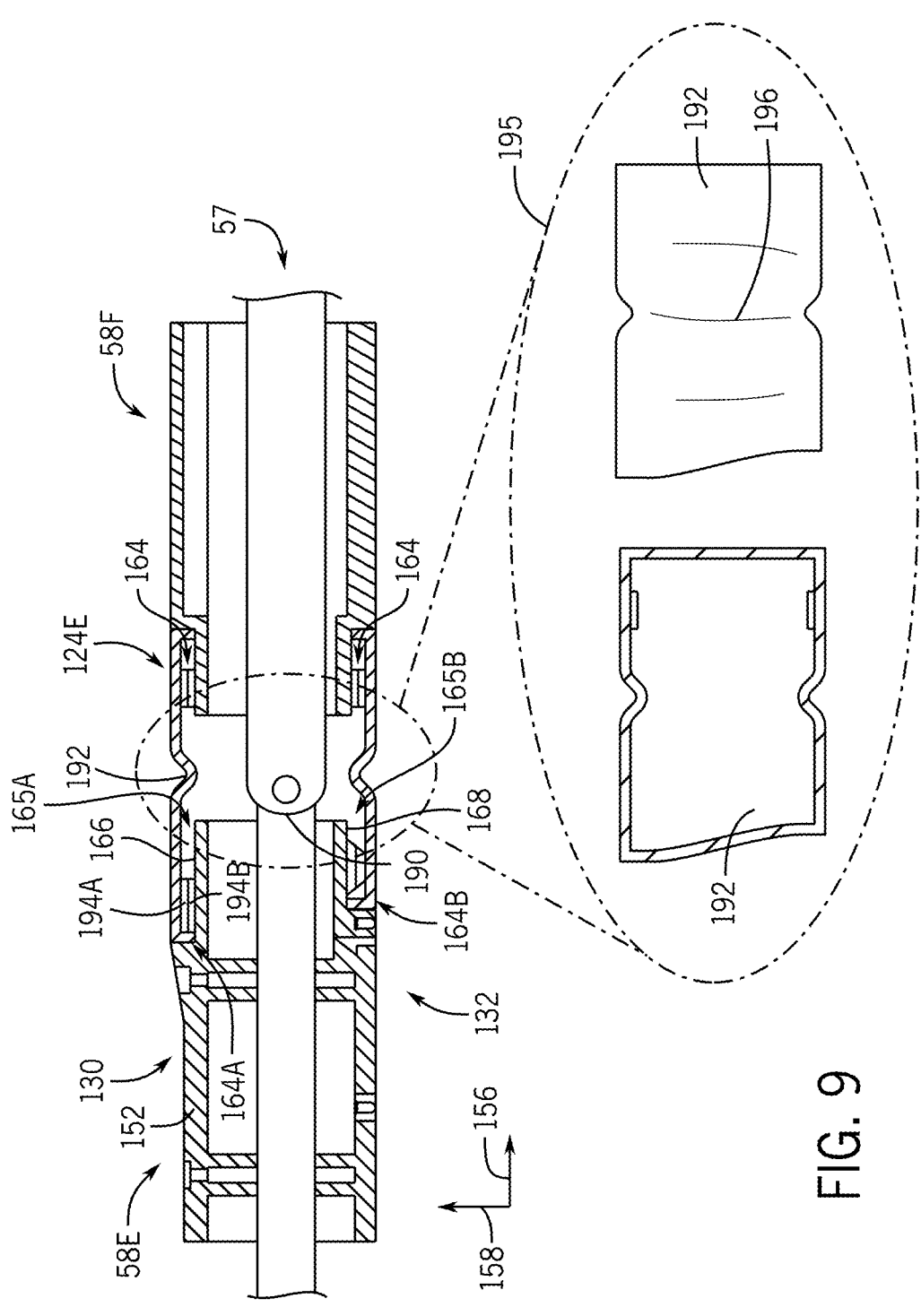
FIG. 9 is a cross-sectional view of an embodiment of a portion of the show element of FIG. 5, with a transition layer at a connection between rigid bodies, in accordance with the present disclosure.

With the foregoing in mind, FIG. 9 is a cross-sectional view of a connection 124 that may be used in the show element 57 in the attraction system 50. In particular, FIG. 9 illustrates a portion of the fifth rigid body 58E and a portion of the sixth rigid body 58F moveably coupled together by a coupling mechanism 190 positioned at the fifth connection 124E. The coupling mechanism 190 may include a pivot, a hinge, and the like to provide movement between the rigid bodies 58E and 58F.

A transition layer 192 may disguise (e.g., cover) the fifth connection 124E between the rigid bodies 58E and 58F from the view of the guest. The transition layer 192 may cover the coupling mechanism 190 (e.g., hidden from view of the guests 54). The transition layer 192 may provide a continuity of form (e.g., shape) and/or projection mapped content across the fifth connection 124E between the rigid bodies 58E and 58F. For example, the transition layer 192 may provide a lofted surface between the rigid bodies 58E and 58F so that the transition layer 192 is non-obtrusive to a silhouette of the rigid bodies 58E and 58F.

Additionally, the transition layer 192 may provide additional visual effects, such as by creating folds or wrinkles along the transition layer 192 during certain movements and/or positions of the rigid bodies 58E and 58F. Accordingly, the transition layer 192 may enable the show element 57 to simulate the appearance of folds or wrinkles that may occur in loose, flexible fabric (e.g., in traditional costumes or clothing), while still providing the rigid bodies 58 for efficient and accurate projection mapping. It should also be appreciated that the transition layer 192 may be configured not to fold, but instead to hold a particular shape (e.g., fixed; block folds, wrinkles, and/or creases).

The transition layer 192 may be a soft polymeric material, such as Neoprene. The transition layer 192 may couple to the shell 152 via any suitable technique, such as via the first fastener 164A and/or the second fastener 164B. For example, the transition layer 192 may couple to a first component 194A of the first fastener 164A, and the shell 152 may couple to the second component 194B of the first fastener 164A. Since the shell 152 includes the cavity wall 166 (e.g., that defines the cavity 165A, as also described with respect to FIG. 8) supporting the first fastener 164A, coupling the transition layer 192 to the shell 152 via the first fastener 164A in this way may result in a smooth transition from the shell 152 (or the cover 163 of FIG. 8, if the cover 163 is applied to the shell 152 as shown in FIG. 8) to the transition layer 192. That is, the transition layer 192 may be flush with the surface of the shell 152 (or the cover 163 of the FIG. 8) when coupled. In this way, the rigid bodies 58 and the transition layer 192 may visually appear as one component to the guests, thereby providing a realistic appearance of the show element 57. Similarly, since the shell 152 includes the additional cavity wall 168 (e.g., that defines the additional cavity 165A, as also described with respect to FIG. 8) supporting the second fastener 164B, the transition layer 192 may be coupled to the shell 152 at multiple locations (e.g., circumferentially about the shell 152). As such, the transition layer 192 may disguise the connection 124 to provide a realistic appearance.

The transition layer 192 may provide a surface for the projection mapping. As discussed herein, movement between the rigid bodies 58E and 58F may cause folds or wrinkles in the costume at the transition layer 192. For example, as shown in an inset 195 of FIG. 9, the transition layer 192 may include a fold 196 adjacent to the coupling mechanism 190. For example, the fold 196 may be crosswise in the longitudinal direction 156 or extend in any other direction. During movement of the rigid bodies 58E and 58F, the transition layer 192 may bend along the fold 196 to create peaks and valleys that may be perceived as wrinkles by the guests 54. During the calibration procedure, the behavior of the transition layer 192 may be determined as well as the position and/or the orientation of the fold 196. As such, the media controller (e.g., the media controller 66 described with respect to FIG. 1) may adjust the image data corresponding to the transition layer 192 (e.g., projected onto the transition layer 192) based on the position, the orientation, and/or the movement of the rigid bodies 58; the behavior of the rigid bodies 58; the behavior of the transition layer 192, or any combination thereof. For example, the media controller may adjust the image data based on the peaks and valleys expected in the fold 196 given the respective positions and/or the respective orientations of the rigid bodies 58.

Figures 10, 11:
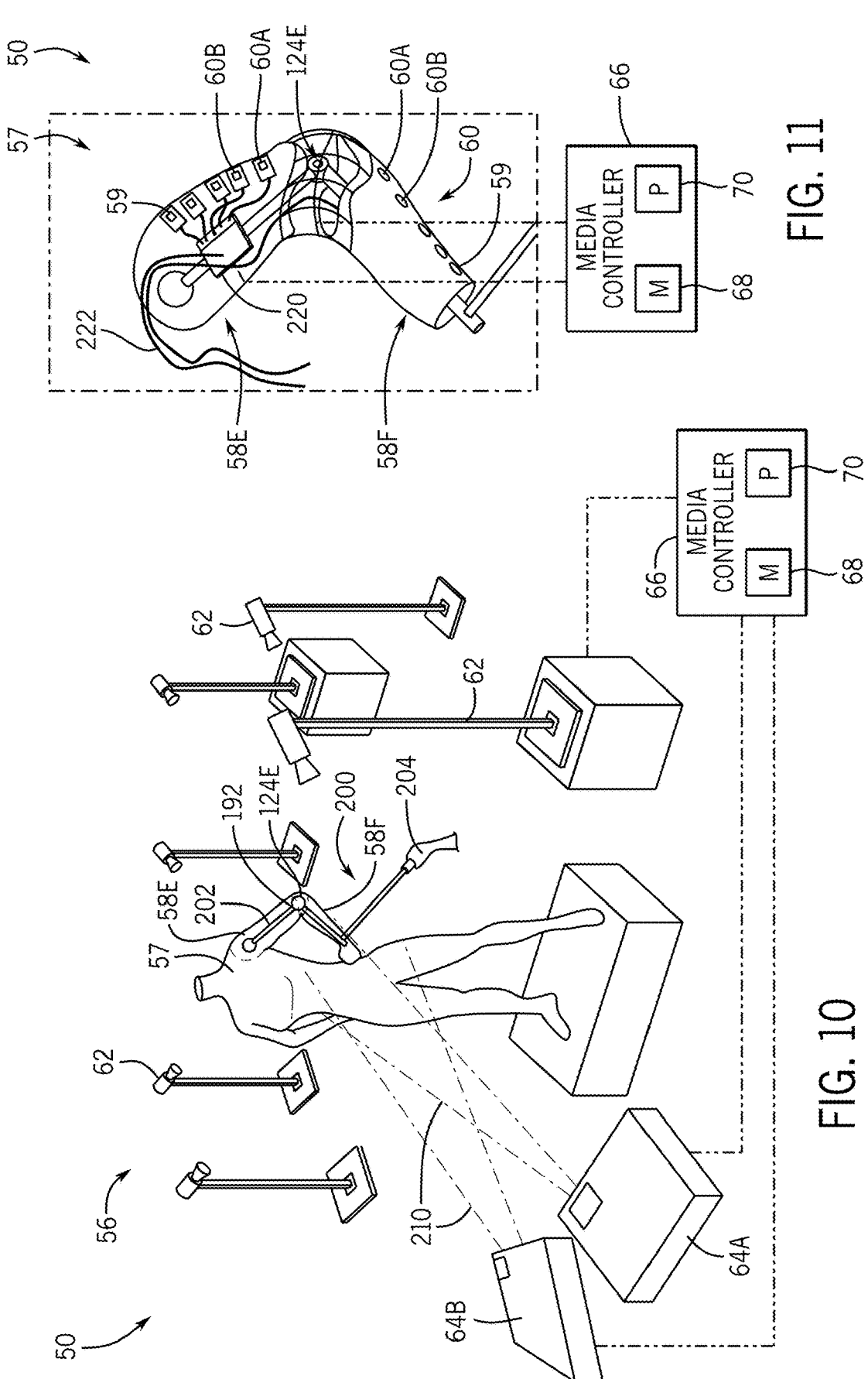
FIG. 10 is a schematic diagram of an embodiment of a show effect system with a show element that may be used in the attraction system of FIG. 1, in accordance with the present disclosure.
FIG. 11 is a close-up view of an embodiment of a portion of the show element of FIG. 10, in accordance with the present disclosure.

FIG. 10 is a schematic diagram of an embodiment of the show effect system 56 that may be used in the attraction system 50. For example, the show element 57 may be used for a live attraction with external actuation for the show element 57 (e.g., external to the show element 57). As illustrated, the rigid bodies 58 may include a puppet arm 200 coupled to a puppetry rod 202 that may be moved by an operator 204, such as a puppeteer. That is, the means for actuating may be a puppeteer moving a rod puppet arm.

The show effect system 56 may include the one or more image sensors 62 to provide the sensor data indicative of the respective position and/or the respective orientation of each of the rigid bodies 58 used in the show element 57 and the one or more projectors 64 to project the images onto the rigid bodies 58. In one embodiment with multiple image sensors 62, each of the image sensors 62 may be positioned at a different location of the environment of the attraction system 50 to provide a comprehensive view of the environment of the attraction system 50. Additionally or alternatively, combining the sensor data from each of the image sensors 62 may improve accuracy of the determination and/or generation of the image data.

Additionally, including multiple projectors 64 may improve image quality of the projection mapping. As illustrated, the show effect system 56 may include multiple projectors 64 that may, individually or collectively, project image data on the multiple rigid bodies 58 forming the show element 57. For example, a first projector 64A may project first images into a fifth rigid body 58E of the show element 57, and a second projector 64B may project second images onto a sixth rigid body 58F of the show element 57. An overlapping portion of the first images and the second images may be blended (e.g., combined, layered, and/or placed), such that the first images and the second images may be perceived as a single image to the guests. An adjacent portion of the first image and the second image may be aligned (e.g., matched and/or placed), such that the first image and the second image may be perceived as a single image to the guests 54.

In certain instances, the media controller 66 may include and/or access a library of image data corresponding to each rigid body 58. The media controller 66 may select image data (e.g., appropriate image data) from the library of image data based on the respective position and/or the respective orientation of each rigid body 58, and then the media controller 66 may transmit and instruct the one or more projectors 64 to project the selected image data onto the rigid bodies 58. That is, the media controller 66 may treat each rigid body 58 as an individual component and select and/or generate image data for each rigid body 58. The image data may be projected by the one or more projectors 64 (e.g., with the overlapping portion and/or the adjacent portion) as images to form a unified image (e.g., costume) perceived by the guests.

In one embodiment, images 210 being projected may include a collection of pixels corresponding to (e.g., to project onto) one rigid body 58, a portion of one rigid body 58, one connection 124 (e.g., the fifth connection 124E) or transition layer 192, a portion of one connection 124 or transition layer 192, or any combination thereof. However, the images 210 being projected may include a collection of pixels corresponding to multiple rigid bodies 58, portions of multiple rigid bodies 58, multiple connections 124 or transition layers 192, portions of multiple connections 124 or transition layers, or any combination thereof. As used herein, a pixel may refer to a minute area of illumination (e.g., a discrete portion of an image that is projected; at least 20 pixels per inch or 400 pixels per square inch) that combines with other pixels to form an image. The one or more projectors 64 may project the images 210 onto respective external surfaces (e.g., projection surfaces), such as respective external surfaces of the rigid bodies 58. As discussed herein, one or more of the external surfaces may be textured to visually appear like fabric. In certain instances, one or more of the rigid bodies 58 may include a curved profile, and the images projected onto the respective external surfaces may accommodate the curved profile, such as via image manipulation and/or distortion by projection mapping software, in order to provide a more realistic appearance of the show element 57.

In an embodiment, the media controller 66 may cause the one or more projectors 64 to project the images 210 based on an operation of multiple possible operations of the attraction system 50. For example, each operation of the multiple possible operations may be associated with image data used for projected images onto the show element 57 (e.g., for projecting different images at different time stamps of the operation of the attraction system 50), and the media controller 66 may select (or generate) and transmit the associated image data based on the determined operation to cause the projector 64 to project the images corresponding to the image data. The media controller 66 may, for example, determine the operation of the attraction system 50 based on a detected operating parameter, such as an operating parameter associated with the guests 54, a ride time, a time (e.g., a time of day), an environmental condition (e.g., a temperature, a detected precipitation), or any combination thereof.

During operation of the attraction system 50, the show element 57 may be moved (e.g., via a manually applied force, based on instructions transmitted from the media controller 66 to the actuators 72). In particular, the multiple rigid bodies 58 used in the show element 57 may be moved relative to each other and/or relative to a reference point within the attraction system 50. For example, the sixth rigid body 58F may be moved relative to the fifth rigid body 58E which may visually appear as movement of the second lower arm. In response, the images 210 projected onto the sixth rigid body 58F may be adjusted so as to maintain a realistic appearance of the show element 57. By way of example, while the sixth rigid body 58F is moving, the media controller 66 and/or the one or more projectors 64 may adjust the position of the projected images 210 to correspond to the movement of the sixth rigid body 58F. Additionally, movement of the sixth rigid body 58F may cause wrinkles to form at the fifth connection 124E. In particular, the transition layer 192 may fold or extend based on the movement of the sixth rigid body 58F. The media controller 66 may adjust the image data corresponding to the fifth connection 124E based on the movement of the sixth rigid body 58F. For example, the media controller 66 may increase luminance of the image data based on peaks and/or valleys formed in the transition layer 192 (e.g., known, predicted, or expected to form in the transition layer 192) to provide a realistic appearance of the show element 57 (e.g., the costume 120) to the guests 54.

Furthermore, it should be noted that the attraction system 50 may include any suitable number of show element(s) 57. In an example, more than one show element 57 may be included within the attraction system 50, and the attraction system 50 may include at least one projector 64 for each show element 57. In another example, multiple projectors 64 may be provided to project images onto multiple sides of a single show element 57, such as a show element 57 that may be visible to guests 54 from multiple directions and angles.

With the foregoing in mind, FIG. 11 is a close-up view of an embodiment of a portion of the show element 57 that may be used in the attraction system 50. In particular, FIG. 11 illustrates the fifth rigid body 58E and the sixth rigid body 58F coupled at the fifth connection 124E. In certain instances, the rigid bodies 58E and 58F may include two types of trackers 60. The trackers 60 may include a first type of tracker 60A (e.g., emitter) that may be tracked by the one or more image sensors and a second type of tracker 60B (e.g., light detector) that may detect light emitted by the one or more projectors. The first type of tracker 60A may include an LED that emits light captured by the one or more image sensors 62, while the second type of tracker 60B may be a light detector that may detect light emitted by the one or more projectors 64. The trackers 60 may couple to a circuit board 220 for power and/or control signals (e.g., from the media controller 66), as well as to provide light detection data (e.g., from the second type of tracker 60B to the media controller 66). The first type of tracker 60A and the second type of tracker 60B may be in a concentric arrangement (e.g., co-located, coaxial, aligned) or positioned in some other known positions relative to one another. Additionally or alternatively, the rigid bodies 58E and 58F may include a cable 222, such as a power wire, a ground wire, a control signal wire, and the like that provides power and/or control signals to the trackers 60 and/or light detection data from the trackers 60. Additionally or alternatively, the circuitry on the circuit board 220 (e.g., PCB) may control pulsed patterns of blinking to differentiate each tracking LED (e.g., active tracking).

A calibration of the show element 57 may be performed prior to the projection mapping to calibrate the one or more image sensors 62 and the one or more projectors 64 to a coordinate system of the attraction system 50. As described herein, the at least one sensor 59 may be utilized to facilitate the calibration. However, it should be appreciated that the trackers 60 may facilitate the calibration (e.g., via emitting light from the first type of tracker 60A and detecting light at the second type of tracker 60B) (e.g., the trackers 60 may operate as or replace the at least one sensor 59). Additionally or alternatively, the calibration may include receiving the dimensions of each rigid body 58 (e.g., by operator input, 3D scanning), receiving relative positions between each of the rigid bodies 58, and/or receiving positions of the connections 124 between each rigid body 58. For example, the rigid body 58 may include a known geometry, surface area, shape, length, width, and so on. The calibration may also include receiving a respective position and/or a respective orientation of each tracker 60 within the rigid bodies 58. The media controller 66 may store such information and data as calibration data.

Figure 12:
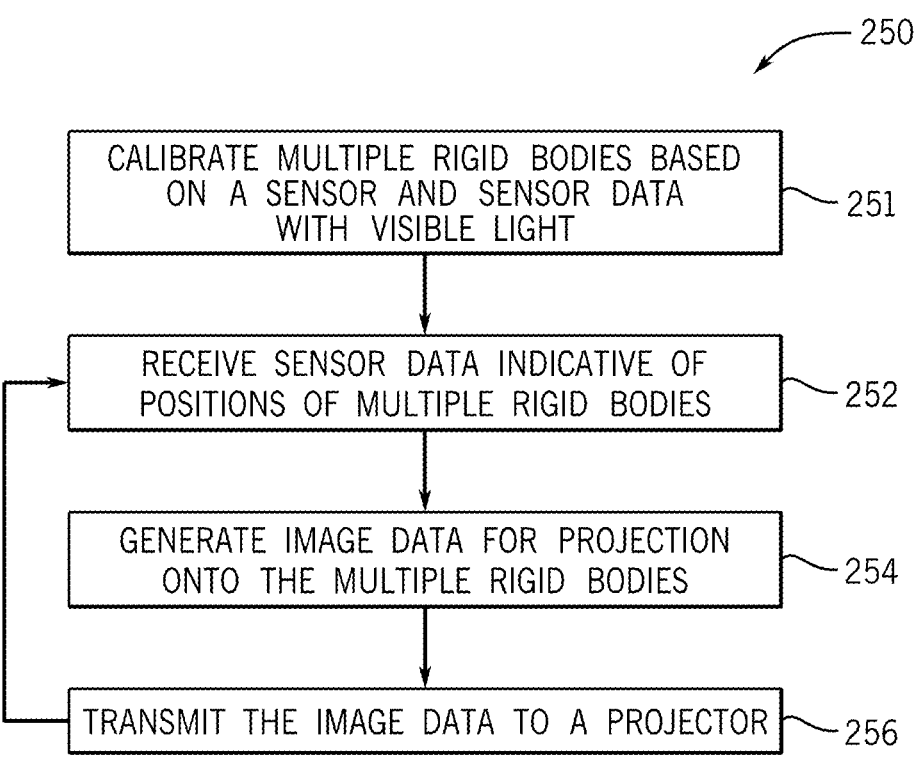
FIG. 12 is a flowchart of an embodiment of a method of operating a show effect system that may be used in the attraction system of FIG. 1, in accordance with the present disclosure.

FIG. 12 is a flowchart of an example method 250 for operating the show effect system. The method 250 includes various steps represented by blocks. It should be noted that the method 250 may be performed as an automated procedure by a control system, such as the media controller 66 of FIG. 1. Although the flow chart illustrates the steps in a certain sequence, it should be understood that the steps may be performed in any suitable order and certain steps may be carried out simultaneously, where appropriate. For example, each of the rigid bodies may move after block 251 (e.g., between any blocks after block 251; at any point after calibration in block 251). Further, certain steps or portions of the method 250 may be performed by separate systems or devices.

At block 251, the controller may calibrate multiple rigid bodies via a detector and/or an emitter, which may form or be incorporated into trackers and which may utilize visible light (e.g., detect visible light from a projector). For example, each of the rigid bodies may include a first type of tracker that may be an emitter and a second type of tracker may be a light detector. The first type of tracker may be tracked by the one or more image sensors. The second type of tracker may detect light emitted the one or more projectors. The trackers may facilitate the calibration, such as receiving a respective position and/or a respective orientation of each tracker within the rigid bodies.

At block 252, the controller may receive sensor data indicative of respective positions of the multiple rigid bodies. For example, the image sensor may provide sensor data indicative of the trackers, and the controller may determine the respective position and/or the respective orientation of each of the rigid bodies based on the sensor data. Additionally or alternatively, the controller may determine the respective position and/or the respective orientation of each of the rigid bodies based on the sensor data and calibration data. and/or respective connections between each of the rigid bodies. In another example, the controller may determine the respective position and/or the respective orientation of each connection between the multiple rigid bodies and/or relative positions between each of the rigid bodies based on the sensor data and/or the calibration data.

At block 254, the controller may generate image data for projection onto the multiple rigid bodies. For, the controller may generate the image data for each rigid body used in the show element based on the sensor data and the calibration data. The controller may determine a size and/or shape of the image data based on the dimensions of the rigid body. In certain instances, the controller may adjust the image data based on the sensor data indicative of the respective position and/or the respective orientation of each rigid body. For example, the sensor data may indicate that a portion of the rigid body may be perceived by the guest. As such, the controller may reduce a size of the image data to correspond to the visible portion of the rigid body. In another example, the sensor data may indicate movement between a first rigid body and a second rigid body that may create wrinkles at the connection. The controller may adjust the image data based on the wrinkles formed at the connection. Still in another example, the controller may access a library of image data and retrieve image data corresponding to a respective rigid body.

At block 256, the controller may transmit the image data to a projector. The controller may instruct the projector to project the images on the multiple rigid bodies to create an immersive and/or entertaining environment for the guests. For example, the controller may instruct the projector to project first images onto a first rigid body, second images onto a second rigid body, and so on. In this way, the projected images may accommodate respective external surfaces of the rigid bodies. Additionally or alternatively, the projector may be instructed to project different image data at different points of the operation to provide a costume change illusion. For example, the controller may instruct the projector to project the first images over a first period of time and a second images over a second period of time, and the projector may dynamically adjust dimensions of the first images and/or the second images based on the sensor data. In this way, the guests 54 may perceive the show element 57 to magically change costumes during operation.

While this disclosure uses the example of a show element (e.g., the show element 57; chair, building, costume, animated figure), the systems and methods of this disclosure may apply to projection mapping onto any of a variety of objects, including costumes worn by live actors, guests, and/or other users; objects carried by live actors, guests, and/or other users; and so forth. For example, a performer may wear a costume divided into multiple rigid bodies, each with one or more respective trackers. An image sensor may provide sensor data indicative of the one or more respective trackers, which may be analyzed by a controller to determine respective positions and/or respective orientations of each rigid body of the multiple rigid bodies. The controller may generate image data for each of the multiple rigid bodies based on the respective positions and/or the respective orientations, as well as respective properties (e.g., known dimensions; behavior), of each of the multiple rigid bodies. The controller may instruct the projector to project images corresponding to the image data onto the costume (e.g., a first image onto a first rigid body of the costume, a second image onto a second rigid body of the costume, and so forth) for a costume change illusion. The controller may track the multiple rigid bodies, generate the image data in real time, and instruct the projector to project the image data in real time (e.g., substantially real time) to provide the costume change illusion even as the costume moves within an environment (e.g., as the user moves while wearing the costume).

Advantageously, embodiments disclosed herein include multiple rigid bodies that are connected (e.g., stitched, fastened) to form and/or to appear as one object (e.g., one article of clothing). The multiple rigid bodies may be separately tracked (e.g., via respective trackers; as separate objects), and images may be separately projected onto each of the multiple rigid bodies in a manner that accounts for respective positions and/or respective orientations of each of the multiple rigid bodies. To provide more realistic features and/or to cause the multiple rigid bodies to appear as the one object in a more realistic manner, the images may also be adjusted to account for known behaviors (e.g., shadows, folds) and/or relationships between the multiple rigid bodies. For example, the show element may include a torso, a head, a neck, and/or limbs in which each body part formed by a rigid body or multiple rigid bodies. The transition between each rigid body may covered by a transition layer, but the projected imagery may blend, interpolate, extrapolate, and/or morph between the rigid bodies to provide the illusion of a cohesive element. In some cases, the embodiments disclosed herein may enable the multiple rigid bodies to mimic or simulate (e.g., appear as) loose, flexible textiles (e.g., costumes worn by an animated character and/or a user). As noted herein, real loose, flexible textiles are difficult to utilize in projection mapping operations due to unpredictable behavior, such as peaks and valleys due to air flow in an environment.

While only certain features of the disclosure have been illustrated and described herein, many modifications and changes will occur to those skilled in the art. It is, therefore, to be understood that the appended claims are intended to cover all such modifications and changes as fall within the true spirit of the disclosure. It should be appreciated that any features shown and described with reference to FIGS. 1-12 may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . ." or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An attraction system, comprising:
    a show element comprising:
        a first rigid body comprising a first surface coupled to a first tracker;
        a second rigid body comprising a second surface coupled to a second tracker;
        a connection coupling the first rigid body and the second rigid body to one another and configured to enable movement of the first rigid body relative to the second rigid body; and
        a transition layer at the connection coupling the first rigid body and the second rigid body to one another, wherein the transition layer is configured to couple to respective end portions of the first rigid body and the second rigid body;
    an image sensor configured to generate sensor data indicative of a first position of the first rigid body and a second position of the second rigid body; and
    a projector configured to project first image data on the first rigid body and second image data on the second rigid body.

2. The attraction system of claim 1, wherein the transition layer comprises:

a first fastener configured to fixedly couple the transition layer to the first rigid body, such that the transition layer is flush with the first surface; and
a second fastener configured to fixedly couple the transition layer to the second rigid body, such that the transition layer is flush with the second surface.

3. The attraction system of claim 1, wherein the first surface and the second surface comprise fiberglass, plastic, metal, ceramic, composite material, or any combination thereof, and wherein the transition layer comprises a flexible material.

4. The attraction system of claim 1, wherein the first tracker is configured to emit or reflect light and the second tracker is configured to emit or reflect light.

5. The attraction system of claim 1, comprising a controller communicatively coupled to the image sensor and the projector and configured to:
    determine the first position and the second position based on the sensor data from the image sensor; and
    generate the first image data and the second image data based on the first position and the second position.

6. The attraction system of claim 5, wherein the controller is configured to:
    determine respective changes in the first position and the second position over time based on the sensor data from the image sensor; and
    adjust the first image data and the second image data based on the respective changes in the first position and the second position over time.

7. The attraction system of claim 1, wherein a first projection surface of the first surface and a second projection surface of the second surface comprises a textured surface or a sculpted surface.

8. A non-transitory, computer-readable medium, comprising instructions, wherein the instructions, when executed by processing circuitry, are configured to cause the processing circuitry to perform operations comprising:
    receiving sensor data from an image sensor of an attraction system, wherein the sensor data indicates respective positions of a plurality of rigid bodies coupled together to form a show element of the attraction system;
    receiving calibration data associated with a plurality of connections of the show element;
    determining the respective positions of the plurality of rigid bodies of the show element based on the sensor data;
    generating respective image data for the plurality of rigid bodies of the show element based on the respective positions and the calibration data, such that the respective image data for at least a portion of the plurality of rigid bodies accounts for an expected behavior of a transition layer at a respective connection of the plurality of connections coupling the at least the portion of the plurality of rigid bodies together; and
    instructing a projector of the attraction system to project the respective image data onto the plurality of rigid bodies of the show element.

9. The non-transitory, computer-readable medium of claim 8, wherein the instructions, when executed by the processing circuitry, are configured to cause the processing circuitry to determine the respective positions of the plurality of rigid bodies of the show element based on:
    receiving additional calibration data, wherein the additional calibration data comprises respective geometries of the plurality of rigid bodies, respective relative locations of the plurality of rigid bodies, respective locations of a plurality of trackers relative to the plurality of rigid bodies, and a coordinate system for the attraction system.

10. The non-transitory, computer-readable medium of claim 8, wherein the instructions, when executed by the processing circuitry, are configured to cause the processing circuitry to generate the respective image data for the at least the portion of the plurality of rigid bodies by:

generating first image data for a first rigid body of the at least the portion of the plurality of rigid bodies based on the calibration data and a respective position of the first rigid body; and generating second image data for a second rigid body of the at least the portion of the plurality of rigid bodies based on the calibration data and a respective position of the second rigid body, wherein the first image data and the second image data overlap at the respective connection between the first rigid body and the second rigid body.

11. The non-transitory, computer-readable medium of claim 10, wherein the instructions, when executed by the processing circuitry, are configured to cause the processing circuitry to perform operations comprising:

generating the first image data, the second image data, or both to account for the expected behavior comprising a fold that forms at the transition layer at the respective connection between the first rigid body and the second rigid body.

12. The non-transitory, computer-readable medium of claim 8, wherein the instructions, when executed by the processing circuitry, are configured to cause the processing circuitry to perform operations comprising:

determining respective changes in the respective positions of the plurality of rigid bodies of the show element over time based on the sensor data from the image sensor; and adjusting the respective image data for the plurality of rigid bodies of the show element based on the respective changes in the respective positions of the plurality of rigid bodies of the show element over time.

13. The non-transitory, computer-readable medium of claim 12, wherein the instructions, when executed by the processing circuitry, are configured to cause the processing circuitry to perform operations comprising:

adjusting the respective image data for the plurality of rigid bodies of the show element based on the respective changes in the respective positions of the plurality of rigid bodies of the show element over time to provide an appearance of a cohesive element.

14. An attraction system, comprising:

a show element comprising:

a plurality of rigid bodies coupled at one or more connections, wherein a first connection of the one or more connections comprises:

a first fastener that movably couples a first frame of a first rigid body of the plurality of rigid bodies to a second frame of a second rigid body of the plurality of rigid bodies; and a transition layer that surrounds the first fastener and respective end portions of the first frame and the second frame; and a plurality of trackers, wherein each rigid body of the plurality of rigid bodies comprises at least one respective tracker of the plurality of trackers;

an image sensor configured to provide sensor data indicative of the plurality of trackers;

a projector configured to project image data on each rigid body of the plurality of rigid bodies; and a controller coupled to the image sensor and the projector, wherein the controller is configured to:

determine a respective position of each rigid body of the plurality of rigid bodies based on the sensor data;

generate image data for each rigid body of the plurality of rigid bodies based on the respective position of each rigid body of the plurality of rigid bodies; and instruct the projector to project the image data onto each rigid body of the plurality of rigid bodies.

15. The attraction system of claim 14, wherein each rigid body of the plurality of rigid bodies comprises:

a rigid frame; and a surface coupled to the rigid frame and comprising a projection surface to receive the image data.

16. The attraction system of claim 14, comprising an actuator coupled to the show element and the controller, wherein the controller is configured to:

instruct the actuator to move the show element to change the respective position of each rigid body of the plurality of rigid bodies over time; and generate the image data based on the respective position of each rigid body of the plurality of rigid bodies over time.

17. The attraction system of claim 14, wherein the controller is configured to:

access calibration data comprising a respective dimension of each rigid body of the plurality of rigid bodies within the show element; and generate the image data based on the calibration data.

18. The attraction system of claim 14, wherein the controller is configured to determine the respective positions of each rigid body of the plurality of rigid bodies according to a coordinate system established for an environment of the attraction system.

19. The attraction system of claim 1, wherein the transition layer is configured to fold, extend, or both based on movement of the first rigid body, movement of the second rigid body, or both.

20. The attraction system of claim 1, wherein the first image data and the second image data overlap at the transition layer to provide an appearance of a unified image.

* * * * *